(12) United States Patent
Solano Arenas et al.

(10) Patent No.: US 12,531,692 B2
(45) Date of Patent: *Jan. 20, 2026

(54) SHORT PHYSICAL DOWNLINK CONTROL CHANNEL (SPDCCH) MAPPING DESIGN

(71) Applicant: Telefonaktiebolaget LM Ericsson (publ), Stockholm (SE)

(72) Inventors: John Camilo Solano Arenas, Dusseldorf (DE); Niklas Andgart, Södra Sandby (SE); Laetitia Falconetti, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,156

(22) Filed: Mar. 8, 2024

(65) Prior Publication Data

US 2024/0223333 A1 Jul. 4, 2024

Related U.S. Application Data

(63) Continuation of application No. 17/713,792, filed on Apr. 5, 2022, now Pat. No. 11,949,619, which is a
(Continued)

(51) Int. Cl.
*H04L 5/00* (2006.01)
*H04L 27/26* (2006.01)
(Continued)

(52) U.S. Cl.
CPC ............ *H04L 5/005* (2013.01); *H04L 5/0007* (2013.01); *H04L 5/0051* (2013.01);
(Continued)

(58) Field of Classification Search
CPC ........... H04W 52/0206; H04W 52/262; H04W 24/08; H04W 72/0446; H04W 72/0453;
(Continued)

(56) References Cited

U.S. PATENT DOCUMENTS 8,767,610 B2 7/2014 Kim et al.
8,908,651 B2 12/2014 Noh et al.
(Continued)

FOREIGN PATENT DOCUMENTS

CN 102036380 A 4/2011
CN 103179670 A 6/2013
(Continued)

OTHER PUBLICATIONS

International Search Report and Written Opinion dated Jan. 11, 2018 for International Application No. PCT/EP2017/078219 filed on Nov. 3, 2017, consisting of 12-pages.
(Continued)

*Primary Examiner* — Jenee Holland
(74) *Attorney, Agent, or Firm* — Weisberg I.P. Law, P.A.

(57) ABSTRACT

A method, network node and wireless device for receiving and/or mapping a physical downlink control channel, PDCCH, to resource elements of a time-frequency grid are provided in which the PDCCH is mapped to resource elements of the time-frequency grid by configuring resource element groups, REGs, each REG spanning one orthogonal frequency division multiplex, OFDM, symbol, and the PDCCH being at least two OFDM symbols. In accordance with one embodiment, the method includes receiving the PDCCH from the network node on one of a plurality of sets of physical resource blocks, PRBs.

16 Claims, 16 Drawing Sheets

Related U.S. Application Data continuation of application No. 16/283,056, filed on Feb. 22, 2019, now Pat. No. 11,323,224, which is a continuation of application No. PCT/EP2017/078219, filed on Nov. 3, 2017.

(60) Provisional application No. 62/418,063, filed on Nov. 4, 2016.

(51) Int. Cl.
*H04W 24/08* (2009.01)
*H04W 72/0446* (2023.01)
*H04W 72/0453* (2023.01)
*H04W 76/27* (2018.01)

(52) U.S. Cl.
CPC .......... *H04L 5/0053* (2013.01); *H04L 5/0082* (2013.01); *H04L 27/2607* (2013.01); *H04W 24/08* (2013.01); *H04W 72/0446* (2013.01); *H04W 72/0453* (2013.01); *H04W 76/27* (2018.02); *H04L 5/0094* (2013.01)

(58) Field of Classification Search
CPC ...... H04W 76/27; H04L 5/005; H04L 5/0007; H04L 5/0051; H04L 5/0053; H04L 5/0082; H04L 5/0094; H04L 5/0064; H04L 5/0076; H04L 5/0048; H04L 27/2607

See application file for complete search history.

(56) References Cited

U.S. PATENT DOCUMENTS

| | | | |
|---|---|---|---|
| 10,063,351 | B2 | 8/2018 | Blankenship et al. |
| 2010/0097937 | A1 | 4/2010 | Pietraski et al. |
| 2011/0200004 | A1 | 8/2011 | Nakashima et al. |
| 2011/0286436 | A1* | 11/2011 | Suzuki ................. H04L 5/026 370/336 |
| 2012/0039220 | A1* | 2/2012 | Chen ................. H04L 5/0053 370/279 |
| 2013/0077597 | A1 | 3/2013 | Nukala et al. |
| 2013/0195021 | A1 | 8/2013 | Kalfon et al. |
| 2013/0201926 | A1 | 8/2013 | Nam et al. |
| 2013/0242770 | A1* | 9/2013 | Chen ............... H04N 21/25841 370/252 |
| 2014/0071954 | A1 | 3/2014 | Au et al. |
| 2014/0119266 | A1 | 5/2014 | Ng et al. |
| 2014/0301238 | A1 | 10/2014 | Chun et al. |
| 2014/0301346 | A1 | 10/2014 | Seo et al. |
| 2014/0307693 | A1 | 10/2014 | Feng et al. |
| 2014/0328302 | A1 | 11/2014 | Park et al. |
| 2014/0328312 | A1 | 11/2014 | Seo et al. |
| 2015/0029886 | A1 | 1/2015 | Seo et al. |
| 2015/0036606 | A1 | 2/2015 | Ji et al. |
| 2015/0036616 | A1 | 2/2015 | Lee et al. |
| 2015/0092695 | A1 | 4/2015 | Zhao et al. |
| 2015/0131565 | A1 | 5/2015 | Nakashima et al. |
| 2015/0163787 | A1 | 6/2015 | Han et al. |
| 2015/0173102 | A1 | 6/2015 | Ruiz Delgado et al. |
| 2015/0180619 | A1 | 6/2015 | Majjigi et al. |
| 2015/0181568 | A1 | 6/2015 | Seo et al. |
| 2015/0181569 | A1 | 6/2015 | Kim et al. |
| 2015/0181573 | A1 | 6/2015 | Takeda et al. |
| 2015/0222395 | A1 | 8/2015 | Suzuki et al. |
| 2015/0282134 | A1 | 10/2015 | Suzuki et al. |
| 2015/0289234 | A1 | 10/2015 | Zhao et al. |
| 2015/0296513 | A1 | 10/2015 | Nogami et al. |
| 2015/0304993 | A1 | 10/2015 | Shimezawa et al. |
| 2015/0304994 | A1 | 10/2015 | Kim |
| 2015/0305059 | A1 | 10/2015 | Li et al. |
| 2016/0007360 | A1 | 1/2016 | Nguyen et al. |
| 2016/0028530 | A1 | 1/2016 | Gong et al. |
| 2016/0044706 | A1 | 2/2016 | Yang et al. |
| 2016/0081107 | A1 | 3/2016 | Yang et al. |
| 2016/0128033 | A1 | 5/2016 | Larsson et al. |
| 2016/0174247 | A1 | 6/2016 | Ruiz Delgado et al. |
| 2016/0255609 | A1 | 9/2016 | Kim et al. |
| 2016/0301556 | A1 | 10/2016 | Nory et al. |
| 2016/0302180 | A1 | 10/2016 | Nory et al. |
| 2016/0337880 | A1 | 11/2016 | Nogami et al. |
| 2018/0054277 | A1 | 2/2018 | Rask et al. |
| 2018/0192420 | A1 | 7/2018 | Hao et al. |
| 2018/0309532 | A1* | 10/2018 | Shimezawa .......... H04J 11/0069 |
| 2018/0324604 | A1 | 11/2018 | Yang et al. |
| 2018/0375636 | A1 | 12/2018 | You et al. |
| 2019/0045527 | A1* | 2/2019 | Shimezawa .......... H04L 1/1854 |
| 2019/0141679 | A1 | 5/2019 | He et al. |
| 2019/0229879 | A1* | 7/2019 | Yi ......................... H04W 24/08 |
| 2019/0260525 | A1 | 8/2019 | Arenas et al. |
| 2020/0404635 | A1 | 12/2020 | Bendlin et al. |

FOREIGN PATENT DOCUMENTS

| | | |
|---|---|---|
| CN | 104115513 A | 10/2014 |
| CN | 104798425 A | 7/2015 |
| EP | 3439396 A1 | 2/2019 |
| EP | 3681084 A1 | 7/2020 |
| JP | 2011030092 A | 2/2011 |
| KR | 20190056437 A | 5/2019 |
| WO | 2013138773 A1 | 9/2013 |
| WO | 2014069958 A1 | 5/2014 |
| WO | 2016064049 A1 | 4/2016 |
| WO | 2017169004 A1 | 10/2017 |
| WO | 2018028385 A1 | 2/2018 |

OTHER PUBLICATIONS

3GPP TSG-RAN WG1 #86 bis R1-1610323; Title: Design aspects of sPDCCH; Agenda Item: 7.2.10.2.1; Source: Ericsson; Document for: Discussion, Decision; Location and Date: Lisbon, Portugal Oct. 10-14, 2016, consisting of 3-pages.

3GPP TSG RAN WG1 Meeting #86bis R1-1609341; Title: Discussion on sPDCCH for sTTI; Agenda Item: 7.2.10.2.1; Source: ZTE, ZTE Microelectronics; Document for: Discussion and Decision; Location and Date: Lisbon, Portugal Oct. 10-14, 2016, consisting of 6-pages.

3GPP TSG-RAN WG1 #86bis R1-1609486; Title: On sPDCCH design for shoten TTI; Agenda Item: 7.2.10.2.1; Source: Intel Corporation; Document for: Discussion and Decision; Location and Date: Lisbon, Portugal Oct. 10-14, 2016, consisting of 5-pages.

3GPP TSG-RAN WG1 #85 R1-164161; Title: Consideration on sPDCCH design for latency reduction; Agenda Item: 6.2.10.1; Source: Intel Corporation; Document for: Discussion and Decision; Location and Date: Nanjing, China May 23-27, 2016, consisting of 5-pages.

3GPP TSG RAN Meeting #72 RP-161299; Title: New Work Item on shortened TTI and processing time for LTE; Agenda Item: 10.1.1; Source: Ericsson; Document for: Approval; Location and Date: Busan, Korea Jun. 13-16, 2016, consisting of 9-pages.

European Patent Examination Report dated Apr. 29, 2019, for Application No. 17 793 946.9, consisting of 9-pages.

3GPP TSG RAN WG1 Meeting #85 R1-164059; Title: sPDCCH design for short TTI; Agenda Item: 6.2.10.1; Source: Huawei, HiSilicon; Document for: Discussion and decision; Location and Date: Nanjing, China, May 23, 2016-May 27, 2016, consisting of 6-pages.

3GPP TSG RAN WG1 Meeting #86 R1-166858; Title: Discussions on sPDCCH for latency reduction; Agenda Item: 7.2.12.2.1; Source: LG Electronics; Document for: Discussion and decision; Location and Date: Gothenburg, Sweden, Aug. 22-26, 2016, consisting of 8-pages.

Korean Notification of Reason for Refusal and English Translation dated Jul. 15, 2020 for Application No. 10-2019-7012704, consisting of 9-pages.

3GPP TSG-RAN WG1 Meeting #86bis R1-1609322; Title: On DL control channel design for shorter TTI operation; Agenda Item: 7.2.10.2.1; Source: Nokia, Alcatel-Lucent Shanghai Bell; Document

(56) References Cited

OTHER PUBLICATIONS for: Discussion and Decision; Location and Date: Lisbon, Portugal, Oct. 10-14, 2016, consisting of 5-pages.
Indian Office Action dated Dec. 30, 2020 for Application No. 201917011372 filed on Mar. 23, 2019, consisting of 6-pages.
Korean Office Action and English Translation dated Jan. 22, 2021 for Application No. 10-2019-7012704, consisting of 5-pages.
Chinese Office Action and Search Report with English Summary Translation dated Mar. 10, 2021 for Application No. 201780068464.8, consisting of 15-pages.
Colombian Office Action with English Summary dated Feb. 23, 2021 for Patent Application No. NC2019/0003966, consisting of 31-pages.
3GPP TSG RAN WG1 Meeting #86 R1-166148, Cpel 1950787P; Title: sPDCCH design for short TTI; Agenda Item: 7.2.12.2.1; Source: Huawei, HiSilicon; Document for: Discussion and decision; Date and Location: Aug. 22-26, 2016, Gothenburg, Sweden, consisting of 7-pages.
EPO Communication dated May 21, 2021 for Patent Application No. 19206593.6, consisting of 10-pages.
Japanese Notice of Allowance and English machine translation dated Jan. 6, 2020 for Application No. 2019-517211, consisting of 6 pages.
Japanese Office Action and English summary dated Mar. 3, 2023 for Application No. 2022-017204, consisting of 9 pages.
Chinese Office Action and English Summary dated Aug. 10, 2023 for Application No. 202111245156.2, consisting of 9 pages.

\* cited by examiner

DISTRIBUTED TRANSMISSION (EXAMPLE FOR 10 MHz BW)

SHORT PHYSICAL DOWNLINK CONTROL CHANNEL (SPDCCH) MAPPING DESIGN

CROSS-REFERENCE TO RELATED APPLICATIONS

This application is a continuation of U.S. application Ser. No. 17/713,792 filed Apr. 5, 2022, which is a continuation of U.S. application Ser. No. 16/283,056 filed Feb. 22, 2019, now issued U.S. Pat. No. 11,323,224, which is a continuation of International Application No. PCT/EP2017/078219, filed Nov. 3, 2017, which claims the benefit of U.S. Provisional Application No. 62/418,063, filed on Nov. 4, 2016, the entireties of all of which are incorporated herein by reference.

TECHNICAL FIELD

Wireless communications, and in particular, short physical downlink control channel (sPDCCH) mapping design.

BACKGROUND

As an initial matter, it is noted that the present disclosure is described within the context of long term evolution (LTE), i.e., evolved universal terrestrial radio access network (E-UTRAN). It should be understood that the problems and solutions described herein are equally applicable to wireless access networks and wireless devices (user-equipment (UE)) implementing other access technologies and standards (e.g. 5G New Radio (NR)). LTE is used as an example technology, and using LTE in the description therefore is particularly useful for understanding the problem and solutions solving the problem.

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Shorter latency than previous generations of third generation partnership project (3GPP) radio access technologies (RATs) was one performance metric that guided the design of Long Term Evolution (LTE). LTE is also now recognized by the end-users to be a system that provides faster access to internet and lower data latencies than previous generations of mobile radio technologies.

Packet data latency is important not only for the perceived responsiveness of the system; it is also a parameter that indirectly influences the throughput of the system. hypertext transfer protocol/transmission control protocol (HTTP/TCP) is the dominating application and transport layer protocol suite used on the Internet today. According to HTTP Archive (http://httparchive.org/trends.php) the typical size of HTTP based transactions over the Internet are in the range of a few 10's of kilobytes (Kbytes) up to 1 megabyte (Mbyte). In this size range, the TCP slow start period is a significant part of the total transport period of the packet stream. During TCP slow start the performance is latency limited. Hence, improved latency can rather easily be shown to improve the average throughput, for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

One area to address when it comes to packet latency reductions is the reduction of transport time of data and control signaling, by addressing the length of a transmission time interval (TTI). In LTE release 8, a TTI corresponds to one subframe (SF) of length 1 millisecond. One such 1 ms TTI is constructed by using 14 orthogonal frequency division multiplex (OFDM) or single carrier frequency division multiple access (SC-FDMA) symbols in the case of normal cyclic prefix and 12 OFDM or SC-FDMA symbols in the case of extended cyclic prefix.

Currently, work in 3GPP (see RP-161299) is ongoing on standardizing "short TTI" or "sTTI" operation, where scheduling and transmission can be done on a faster timescale. Therefore, the legacy LTE subframe is subdivided into several sTTI. Supported lengths for sTTI of 2, 4 and 7 OFDM symbols are currently being discussed. Data transmission in downlink (DL) may happen per sTTI via the short physical downlink shared channel (sPDSCH), which may include a control region short downlink control channel (sPDCCH). In the uplink (UL), data is transmitted per sTTI via short physical uplink shared channel (sPUSCH); control can be transmitted via the short physical uplink control channel (sPUCCH).

Different alternatives are possible to schedule a sTTI in the UL or DL to a wireless device. In one alternative, individual wireless devices receive information about sPDCCH candidates for short TTI via radio resource control (RRC) configuration, telling the wireless device where to look for the control channel for short TTI, i.e., sPDCCH. The downlink control information (DCI) for sTTI is actually included directly in sPDCCH. In another alternative, the DCI for sTTI is split into two parts, a slow DCI sent in the PDCCH and a fast DCI sent in the sPDCCH. The slow grant can contain the frequency allocation for a DL and an UL short TTI band to be used for short TTI operation, and it can also contain refinement about the sPDCCH candidate locations.

3GPP Long Term Evolution (LTE) technology is a mobile broadband wireless communication technology in which transmissions from base stations (referred to as eNBs) to mobile stations (referred to as wireless devices (WDs)) are sent using orthogonal frequency division multiplexing (OFDM). OFDM splits the signal into multiple parallel sub-carriers in frequency. The basic unit of transmission in LTE is a resource block (RB) which in its most common configuration consists of 12 subcarriers and 7 OFDM symbols (one slot) in the case of normal cyclic prefix. In the case of extended cyclic prefix, a RB consists of 6 OFDM symbols in the time domain. A common term is also a physical resource block (PRB) to indicate the RB in the physical resource. Two PRBs in the same subframe that use the same 12 subcarriers are denoted a PRB pair. This is the minimum resource unit that can be scheduled in LTE.

A unit of one subcarrier and 1 OFDM symbol is referred to as a resource element (RE, as shown in FIG. 1. Thus, a PRB consists of 84 REs. An LTE radio subframe is composed of multiple resource blocks in frequency with the number of PRBs determining the bandwidth of the system and two slots in time as shown in FIG. 2

In the time domain, LTE downlink transmissions are organized into radio frames of 10 ms, each radio frame consisting of ten equally-sized subframes of length $T_{subframe}=1$ ms.

Messages transmitted over the radio link to users can be broadly classified as control messages or data messages.

Control messages are used to facilitate the proper operation of the system as well as proper operation of each wireless device within the system. Control messages could include commands to control functions such as the transmitted power from a wireless device, signaling of RBs within which the data is to be received by the wireless device or transmitted from the wireless device and so on.

In Rel-8, the first one to four OFDM symbols, depending on the configuration, in a subframe are reserved to contain such control information, as shown in FIG. 2. Furthermore, in Rel-11, an enhanced control channel was introduced (evolved physical downlink control channel—EPDCCH)), in which PRB pairs are reserved to exclusively contain EPDCCH transmissions, while excluding from the PRB pair the one to four first symbols that may contain control information to wireless devices of releases earlier than Rel-11. See FIG. 3.

Hence, the EPDCCH is frequency multiplexed with PDSCH transmissions, contrary to the PDCCH which is time multiplexed with the PDSCH transmissions. The resource allocation (RA) for PDSCH transmissions exists in several RA types, depending on the downlink control information (DCI) format. Some RA types has a minimum scheduling granularity of a resource block group (RBG), see TS 36.211. An RBG is a set of adjacent (in frequency) resource blocks and when scheduling the wireless device, the wireless device is allocated resources in terms of RBGs and not individual RBs.

When a wireless device is scheduled in the downlink from an EPDCCH, the wireless device shall assume that the PRB pairs carrying the DL assignment are excluded from the resource allocation, i.e., rate matching applies. For example, if a wireless device is scheduled in the PDSCH in a certain RBG of size 3 adjacent PRB pairs, and one of these PRB pairs contain the DL assignment, the wireless device shall assume that the PDSCH is only transmitted in the two remaining PRB pairs in this RBG. Note also that multiplexing of PDSCH and any EPDCCH transmission within a PRB pair is not supported in Rel-11.

The PDCCHs and EPDCCHs are transmitted over radio resources that are shared between several wireless devices (WDs). Each PDCCH consists of smaller parts, known as control channel elements (CCE), to enable link adaptation (by controlling the number of CCEs a PDCCH is utilizing). It is specified that for PDCCH, a wireless device must monitor 4 aggregation levels of CCEs, namely, 1, 2, 4, and 8, for a wireless device-specific search space and 2 aggregation levels of CCEs, namely, 4 and 8, for a common search space.

In TS 36.213, Section 9.1.1, a search space $S_k^{(L)}$ at aggregation level $L \in \{1,2,4,8\}$ is defined by a contiguous set of CCEs given by $$(Z_k^{(L)} + i) \bmod N_{CCE,k} \qquad (1)$$

where $N_{CCE,k}$ is the total number of CCEs in the control region of subframe k, $Z_k^{(L)}$ defines the start of the search space, $i=0,1,\ldots,M^{(L)} \cdot L - 1$ and $M^{(L)}$ is the number of PDCCHs to monitor in the given search space. Each CCE contains 36 quadrature phase shift keying (QPSK) modulation symbols. The value of $M^{(L)}$ is specified by Table 9.1.1-1 in 36.213, as shown below:

TABLE 1

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

With this definition, the search space for different aggregation levels may overlap with each other regardless of system bandwidth. More specifically, the wireless device-specific search space and the common search space might overlap and the search spaces for different aggregation levels might overlap. See one example shown below where there are 9 CCEs in total and very frequent overlap between PDCCH candidates:

Example 1: $N_{CCE,k}=9$, $Z_k^{(L)}=\{1, 6, 4, 0\}$ for $L=\{1, 2, 4, 8\}$, respectively.

| Type | Search space $S_k^{(L)}$ Aggregation Level L | PDCCH candidates in terms of CCE index |
|---|---|---|
| UE-Specific | 1 | {1}, {2}, {3}, {4}, {5}, {6} |
| | 2 | {6, 7}, {8, 0}, {1, 2}, {3, 4}, {5, 6}, {7, 8} |
| | 4 | {4, 5, 6, 7}, {8, 0, 1, 2} |
| | 8 | {0, 1, 2, 3, 4, 5, 6, 7}, {8, 0, 1, 2, 3, 4, 5, 6} |
| Common | 4 | {0, 1, 2, 3}, {4, 5, 6, 7}, {8, 0, 1, 2}, {3, 4, 5, 6} |
| | 8 | {0, 1, 2, 3, 4, 5, 6, 7}, {8, 0, 1, 2, 3, 4, 5, 6} |

After channel coding, scrambling, modulation and interleaving of the control information the modulated symbols are mapped to the resource elements in the control region. To multiplex multiple PDCCHs onto the control region, control channel elements (CCE) have been defined, where each CCE maps to 36 resource elements (RE). One PDCCH can, depending on the information payload size and the required level of channel coding protection, consist of 1, 2, 4 or 8 CCEs, and the number is denoted as the CCE aggregation level (AL). By choosing the aggregation level, link-adaptation of the PDCCH is obtained. In total there are $N_{CCE}$ CCEs available for all the PDCCHs to be transmitted in the subframe and the number $N_{CCE}$ varies from subframe to subframe depending on the number of control symbols n and the number of antenna ports configured.

As $N_{CCE}$ varies from subframe to subframe, the terminal needs to blindly determine the position and the number of CCEs used for its PDCCH which can be a computationally intensive decoding task. Therefore, some restrictions on the number of possible blind decodings a terminal needs to go through have been introduced. For instance, the CCEs are numbered and CCE aggregation levels of size K can only start on CCE numbers evenly divisible by K, as shown in FIG. 4.

The set of candidate control channels formed by CCEs where a terminal needs to blindly decode and search for a valid PDCCH are called search spaces. This is the set of CCEs on an AL a terminal should monitor for scheduling assignments or other control information, as shown in FIG.

5. In each subframe and on each AL, a terminal will attempt to decode all the PDCCHs that can be formed from the CCEs in its search space. If the CRC checks, then the content of the PDCCH is assumed to be valid for the terminal and it further processes the received information. Often, two or more terminals will have overlapping search spaces and the network has to select one of them for scheduling of the control channel. When this happens, the non-scheduled terminal is said to be blocked. The search spaces vary pseudo-randomly from subframe to subframe to minimize this blocking probability.

A search space is further divided to a common and a terminal specific part. In the common search space, the PDCCH containing information to all or a group of terminals is transmitted (paging, system information, etc.). If carrier aggregation is used, a terminal will find the common search space present on the primary component carrier (PCC) only. The common search space is restricted to aggregation levels 4 and 8 to give sufficient channel code protection for all terminals in the cell (since it is a broadcast channel, link adaptation cannot be used). The $m_8$ and $m_4$ first PDCCH (with lowest CCE number) in an AL of 8 or 4 respectively, belongs to the common search space. For efficient use of the CCEs in the system, the remaining search space is terminal specific at each aggregation level.

FIG. 5 shows the search space (highlighted) a certain terminal needs to monitor. In total there are $N_{CCE}$=15 CCEs in this example and the common search space is marked with stripes.

A CCE consists of 36 QPSK modulated symbols that map to the 36 RE unique for this CCE. To maximize the diversity and interference randomization, interleaving of all the CCEs is used before a cell specific cyclic shift and mapping to REs are performed, as shown in FIG. 6, blocks S10-S20. Note that in most cases, some CCEs are empty due to the PDCCH location restriction to terminal search spaces and aggregation levels. The empty CCEs are included in the interleaving process and mapping to RE as any other PDCCH to maintain the search space structure. Empty CCE are set to zero power and this power can instead be used by non-empty CCEs to further enhance the PDCCH transmission.

Furthermore, to enable the use of 4 antenna transmit (TX) diversity, a group of 4 adjacent QPSK symbols in a CCE is mapped to 4 adjacent RE, denoted a RE group (REG). Hence, the CCE interleaving is quadruplex (group of 4) based and the mapping process has a granularity of 1 REG and one CCE corresponds to 9 REGs (=36 RE).

There will also in general be a collection of REG that remains as leftovers after the set of size $N_{CCE}$ CCEs has been determined (although the leftover REGs are always fewer than 36 RE) since the number of REGs available for PDCCH in the system bandwidth is in general not an even multiple of 9 REGs. These leftover REGs are in LTE unused by the system.

Similar as for PDCCH, the EPDCCH is transmitted over radio resources shared by multiple wireless devices and enhanced CCEs (eCCEs) are introduced as the equivalent to CCE for PDCCH. An eCCE has also a fixed number of REs but the number of REs available for EPDCCH mapping is generally fewer than this fixed number because many REs are occupied by other signals such as cell-specific reference signal (CRS), corresponding to CRS referred to as channel reference symbols, and channel state information reference signal (CSI-RS). Code chain rate matching is applied whenever a RE belonging to a eCCE contains other colliding signals such as the CRS, CSI-RS, legacy control region or in case of time division duplex (TDD), the guard period (GP) and uplink pilot time slots (UpPTS) 36.211.

Consider the example in FIG. 7, where (a) illustrates the PDCCH mapping, which avoids the CRS so that a CCE consists of available REs. In (b), it is shown how the eCCE consists of 36 RE nominally, but the number of available REs is less in cases where there are colliding signals, hence RE for EPDCCH. Since the colliding signals are subframe dependent, the number REs that are available for eCCE becomes subframe dependent as well, and could even be different for different eCCEs if the collisions impact on the eCCEs unevenly. For the PDCCH, there is always 36 RE available (a), but here in (b), the nominal 36 are punctured so a lower value is available.

It is noted that when the number of eCCE per PRB pair is 2, the nominal number of RE per eCCE is not 36, but instead, 72 or 64 for normal and extended CP length respectively. In Rel-11, the EPDCCH supports only the wireless device specific search space whereas the common search space remains to be monitored in the PDCCH in the same subframe. In future releases, the common search space may be introduced also for EPDCCH transmission.

It is specified that the wireless device monitors eCCE aggregation levels 1, 2, 4, 8, 16 and 32 with restrictions shown.

In distributed transmission, an EPDCCH is mapped to resource elements in up to D PRB pairs, where D=2, 4, or 8 (the value of D=16 is also being considered in 3GPP). In this way frequency diversity can be achieved for the EPDCCH message.

FIG. 8 shows a downlink subframe having 4 parts belonging to an EPDCCH that is mapped to multiples of the enhanced control regions known as PRB pairs, to achieve distributed transmission and frequency diversity or subband precoding.

In localized transmission, an EPDCCH is mapped to one PRB pair only, if the space allows (which is always possible for aggregation level one and two and for normal subframes and normal CP length also for level four). In case the aggregation level of the EPDCCH is too large, a second PRB pair is used as well, and so on, using more PRB pairs, until all eCCE belonging to the EPDCCH has been mapped. See FIG. 9 for an illustration of localized transmission.

FIG. 9 shows a downlink subframe showing the 4 eCCEs belonging to an EPDCCH that is mapped to one of the enhanced control regions, to achieve localized transmission.

As an example, in normal subframe and with normal CP length and with $n_{EPDCCH} \geq 104$, localized transmission use aggregation levels (1,2,4,8) and they are mapped to (1,1,1,2) PRB pairs respectively.

To facilitate the mapping of eCCEs to physical resources, each PRB pair is divided into 16 enhanced resource element groups (eREGs) and each eCCE is split into 4 or 8 eREGs for normal and extended cyclic prefix, respectively. An EPDCCH is consequently mapped to a multiple of four or eight eREGs depending on the aggregation level. These eREGs belonging to an ePDCCH reside in either a single PRB pair (as is typical for localized transmission) or a multiple of PRB pairs (as is typical for distributed transmission).

SUMMARY

In order to quickly schedule low latency data on the short TTIs, a new short PDCCH (sPDCCH) can be defined. Since the short TTI operation is desired to co-exist with legacy TTI operation, the sPDCCH should be placed in-band within the PDSCH, still leaving resources for legacy data.

Legacy control channels PDCCH and EPDCCH use CRS and DMRS demodulation, respectively. For operation in both these environments, an sPDCCH should support both CRS and DMRS, and to maintain efficiency, resources not used by sPDCCH should be used by the sPDSCH (the short PDSCH).

A specific DL control channel for short TTI, called sPDCCH (PDCCH for short TTI) in this document, is introduced for short TTI. For that, an efficient design is defined for mapping sPDCCH candidates to the resource elements (REs) of the time-frequency grid.

Some embodiments advantageously provide a method, network node and wireless device for mapping a short physical downlink control channel, sPDCCH, to resource elements of a time-frequency grid to achieve one of high frequency diversity and condensed frequency allocation. According to one aspect, a method in network node for mapping a short physical downlink control channel (sPDCCH) to resource elements of a time-frequency grid is provided. The method includes determining available time-frequency resources to be configured as short resource element groups (sREGs). The method also includes configuring sREGs within a physical resource block (PRB) to map the sPDCCH to the resource elements, each sREG spanning one OFDM symbol.

According to this aspect, in some embodiments, an sREG consists of 1 PRB within 1 OFDM symbol including resource elements, REs, for at least one of cell-specific reference signal (CRS) and demodulation reference signals (DMRS) applied to DMRS-based sPDCCH. In some embodiments, an sREG consists of 1 PRB within 1 OFDM symbol including resource elements, REs, for at least one of CRS and DMRS applied to CRS-based sPDCCH. In some embodiments, the sREGs are configured to be one of localized in a frequency domain and distributed in the frequency domain. In some embodiments, the method further includes configuring a wireless device by radio resource control (RRC) signaling to use a CRS based sPDCCH resource block set with one of distributed or localized mapping of short control channel elements (sCCE) to sREGs. In some embodiments, the method further includes configuring a wireless device by RRC signaling to use a DMRS based sPDCCH resource block set with one of distributed or localized mapping of sCCE to sREGs. In some embodiments, the method further includes configuring an sPDCCH PRB set with at least a set of PRBs and one of localized and distributed sCCE to sREG mapping. In some embodiments, 1 OFDM symbol sPDCCH is defined for CRS based transmissions. In some embodiments, for CRS based sPDCCH, with 2 or 3 sPDCCH symbol short transmission time intervals (sTTI), a number of OFDM symbols per RB set is one of 1 and 2. In some embodiments, for CRS based sPDCCH, with 1 slot sTTI a number of OFDM symbols per RB set is one of 1 and 2. In some embodiments, a 2 OFDM symbol sPDCCH is defined for DMRS-based transmissions. In some embodiments, for DMRS based sPDCCH, with 2 sPDCCH symbol sTTI a number of OFDM symbols per RB set is 2. In some embodiments, for DMRS based sPDCCH, with 3 symbol sTTI a number of OFDM symbols per RB set is 3. In some embodiments, for DMRS based sPDCCH, with 1 slot sTTI a number of OFDM symbols per RB set is 2.

According to another aspect, a network node for mapping a short physical downlink control channel, sPDCCH, to resource elements of a time-frequency grid is provided. The network node includes processing circuitry configured to determine available time-frequency resources to be configured as short resource element groups (sREGs). The processing circuitry is further configured to configure sREGs within a physical resource block (PRB) to map the sPDCCH to the resource elements, each sREG spanning one OFDM symbol.

In some embodiments, an sREG consists of 1 PRB within 1 OFDM symbol including resource elements (REs) for at least one of CRS and DMRS applied to DMRS-based sPDCCH. In some embodiments, an sREG consists of 1 PRB within 1 OFDM symbol including REs for at least one of CRS and DMRS applied to CRS-based sPDCCH. In some embodiments, the sREGs are configured to be one of localized in a frequency domain and distributed in the frequency domain. In some embodiments, the processing circuitry is further configured to configure a wireless device by RRC to use a CRS based sPDCCH resource block set with one of distributed or localized mapping of sCCE to sREGs. In some embodiments, the processing circuitry is further configured to configure a wireless device by RRC signaling to use a DMRS based sPDCCH resource block set with one of distributed or localized mapping of sCCE, to sREGs. In some embodiments, the processing circuitry is further configured to configure an sPDCCH PRB set with at least a set of PRBs, and one of localized and distributed sCCE to sREG mapping. In some embodiments, 1 OFDM symbol sPDCCH is defined for cell-specific reference signal (CRS) based transmissions. In some embodiments, for CRS based sPDCCH, with 2 or 3 sPDCCH symbol sTTI a number of OFDM symbols per RB set is one of 1 and 2. In some embodiments, for CRS based sPDCCH, with 1 slot sTTI a number of OFDM symbols per RB set is one of 1 and 2. In some embodiments, a 2 OFDM symbol sPDCCH is defined for DMRS-based transmissions. In some embodiments, for DMRS based sPDCCH, with 2 sPDCCH symbol sTTI a number of OFDM symbols per RB set is 2. In some embodiments, DMRS based sPDCCH, with 3 symbol sTTI a number of OFDM symbols per RB set is 3. In some embodiments, for DMRS based sPDCCH, with 1 slot sTTI a number of OFDM symbols per RB set is 2.

According to another aspect, a network node for mapping a short physical downlink control channel (sPDCCH) to resource elements of a time-frequency grid to achieve one of high frequency diversity and condensed frequency allocation. The network node includes a memory module configured to store a mapping of the sPDCCH to resource elements of a time-frequency grid. The network further includes a short resource element group (sREG) configuration module configured to configure sREGs within a physical resource block (PRB), to map the sPDCCH to the resource elements, each sREG spanning one OFDM symbol.

According to yet another aspect, a method in a wireless device for receiving information on a sPDCCH signaled by a network node, the sPDCCH being mapped to resource elements of a time-frequency grid, by configuring sREGs is provided. The method includes receiving the sPDCCH from the network node on one of a plurality of sets of PRBs.

According to this aspect, in some embodiments, the sPDCCH is of 2 OFDM symbols. In some embodiments, the method further includes receiving an indication of a sequential order of PRBs from the network node.

According to another aspect, a wireless device for receiving information on a sPDCCH signaled by a network node, the sPDCCH being mapped to resource elements of a time-frequency grid, by configuring sREGs, each sREG spanning one orthogonal frequency division multiplex, OFDM, symbol is provided. The wireless device includes a transceiver configured to receive the sPDCCH from the network node on one of a plurality of sets of PRBs.

According to this aspect, in some embodiments, the sPDCCH is of 2 OFDM symbols. In some embodiments, the transceiver is further configured to receive an indication of a sequential order of PRBs from the network node.

According to yet another aspect, a wireless device for receiving information on a sPDCCH signaled by a network node, the sPDCCH being mapped to resource elements of a time-frequency grid, by configuring sREGs is provided. The wireless device includes a transceiver module configured to receive the sPDCCH from the network node on one of a plurality of sets of PRBs.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 18 is an OFDM distribution scheme for a set of 18 PRBs;

FIG. 19 is a 1-OFDM symbol sPDCCH localized scheme;

FIG. 20 is a 2-OFDM symbol sPDCCH distributed scheme;

FIG. 21 is a 2-OFDM symbol sPDCCH localized scheme; and

FIG. 22 is an additional 2-OFDM symbol sPDCCH distributed scheme.

DETAILED DESCRIPTION

Figure 1:
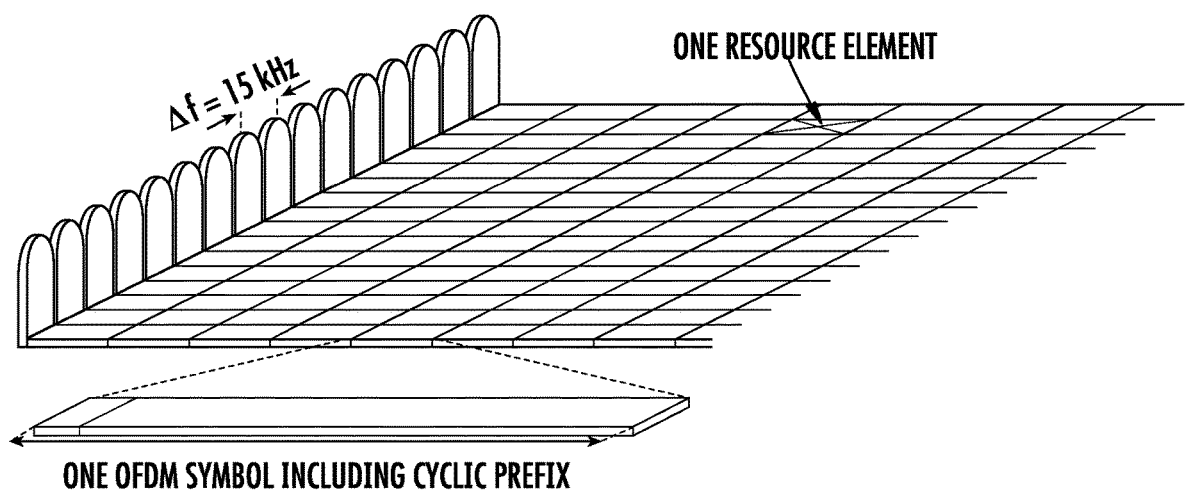
FIG. 1 is a diagram of a time-frequency grid.
Figure 2:
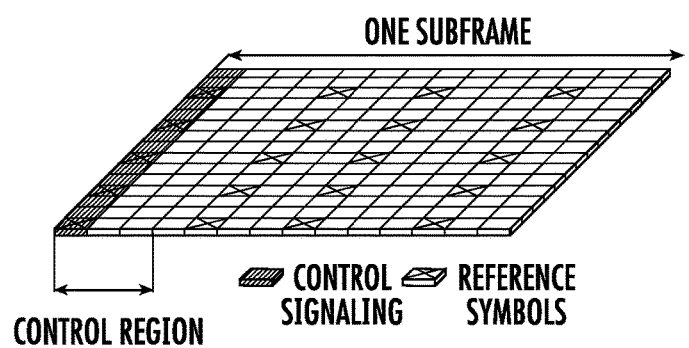
FIG. 2 is a diagram of downlink subframe.
Figure 3:
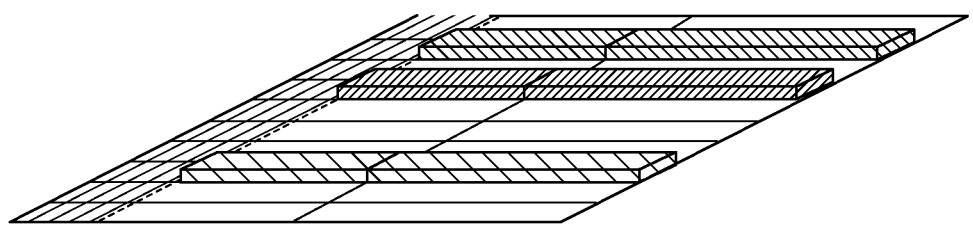
FIG. 3 is a diagram of a downlink subframe showing 10 RB pairs and configuration of three ePDCCH regions.
Figure 4:
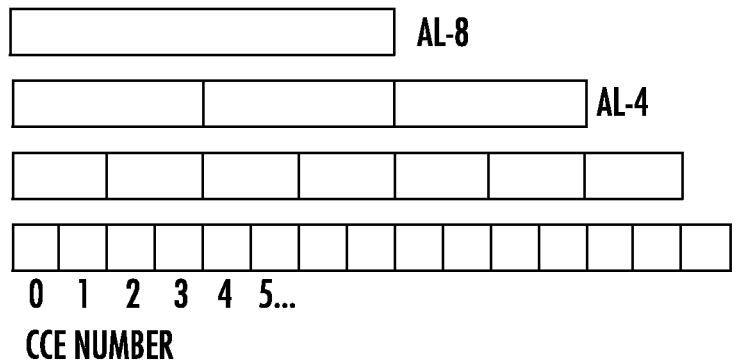
FIG. 4 is a diagram of CCE aggregation.
Figure 5:
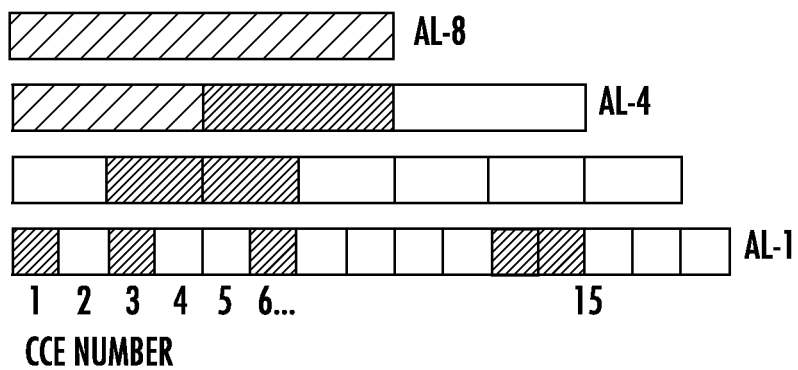
FIG. 5 is a diagram showing a search space to be monitored by a wireless device.
Figure 6:
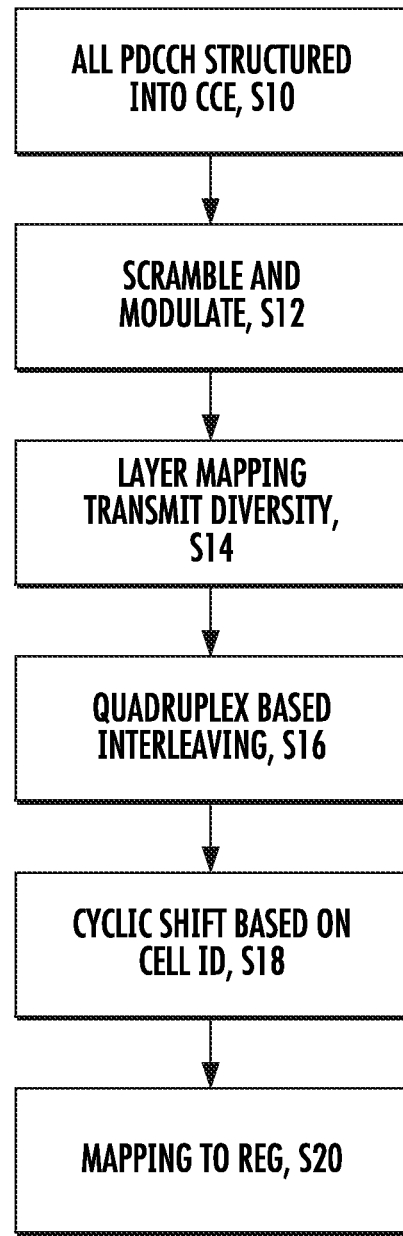
FIG. 6 is a flowchart of processing steps for PDCCH formation.
Figure 7:
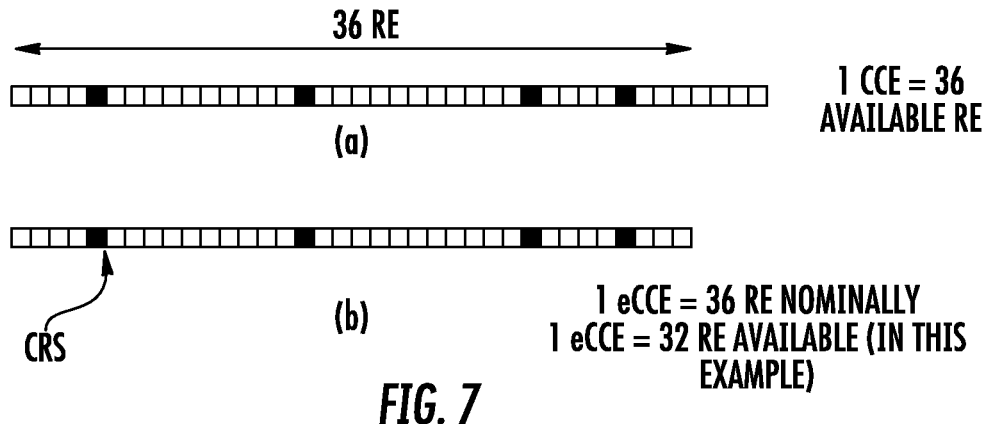
FIG. 7 illustrates differences between a CCE and an eCCE.
Figure 8:
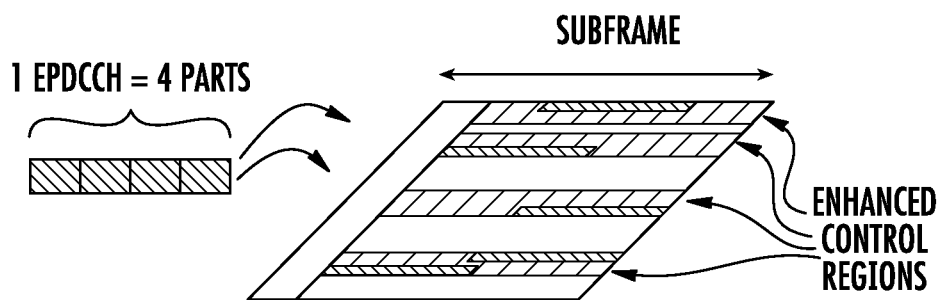
FIG. 8 is a downlink subframe having 4 parts belonging to an ePDCCH.
Figure 9:
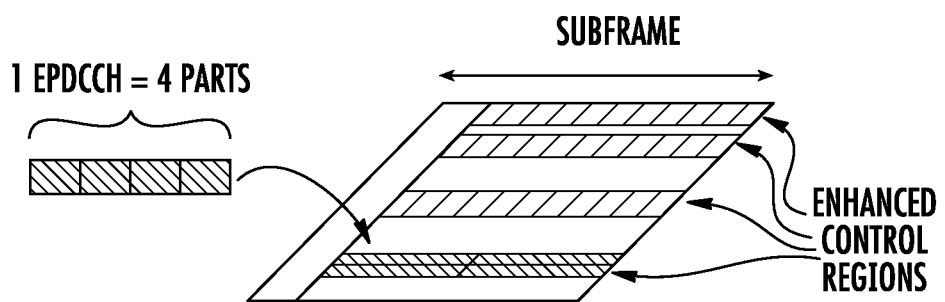
FIG. 9 is a downlink subframe showing a different mapping of 4 eCCEs.

Before describing in detail exemplary embodiments, it is noted that the embodiments reside primarily in combinations of apparatus components and processing steps related to short physical downlink control channel (sPDCCH) mapping design. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Note that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

The term wireless device or user equipment (UE) used herein may refer to any type of wireless device communicating with a network node and/or with another wireless device in a cellular or mobile communication system. Examples of a wireless device are target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

The term "network node" used herein may refer to a radio network node or another network node, e.g., a core network node, MSC, MME, O&M, OSS, SON, positioning node (e.g. E-SMLC), MDT node, etc.

The term "radio network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Although embodiments are described herein with reference to certain functions being performed by a network node, it is understood that the functions can be performed in other network nodes and elements. It is also understood that the functions of the network node can be distributed across network cloud so that other nodes can perform one or more functions or even parts of functions described herein.

A flexible mapping for sPDCCH to the resource elements (REs) is proposed. The proposed mapping has various modes, each enabling exploitation of the particularity of the channel or of advanced transmission modes. In one mode, large frequency diversity is achieved, and in another mode, condensed frequency allocation for, e.g., beamforming based transmission mode, is enabled. The proposed mapping also can be extended to various numbers of OFDM symbols. In the following, examples are given for the case of one and two OFDM symbols used by sPDCCH, but the proposed design can be adapted to even larger number of OFDM symbols.

The same scheme can be used to select localized or distributed placement, of one or two symbols sPDCCH, all controlled by a scheduling decision by the network node, e.g., eNB: the proposed design can achieve high frequency diversity or condensed frequency allocation; and the proposed design can be adapted to a sPDCCH time region of one to several OFDM symbols. With the proposed sPDCCH design, users with transmission modes relying on different reference signals, e.g., CRS and DMRS users, can coexist on the same sTTI. The proposed design allows unused resources on the sPDCCH to be utilized for the sPDSCH.

To facilitate the definition of the sPDCCH mapping to resource elements, special entities are defined: sREG and sCCE. This follows the methodology used so far in the LTE specifications for defining PDCCH and ePDCCH, as described above. Note that the definition of the same mapping can also be performed without using these terms or by using equivalent terms.

Even though longer length can be considered, the possible lengths for sPDCCH in the time domain are 1 or 2 OFDM symbols for sTTI operation. The REs of a PRB in a given OFDM symbol of the sTTI can built from one or more sREG. The number of REs in a sREG may also be variable in order to provide allocation flexibility and to support good frequency diversity.

In one embodiment, two sREG configuration options for a sPDCCH are defined:
PRB based sREG, which means that a sREG is built up with the complete number of REs in a PRB within 1 OFDM symbol (i.e., 12 REs per sREG for 1 OFDM symbol), or
Fractioned PRB based sREG, which means that the number of REs in a PRB within 1 OFDM symbol is split and assigned to a sREG (e.g., 6 REs per sREG).

Figure 10:
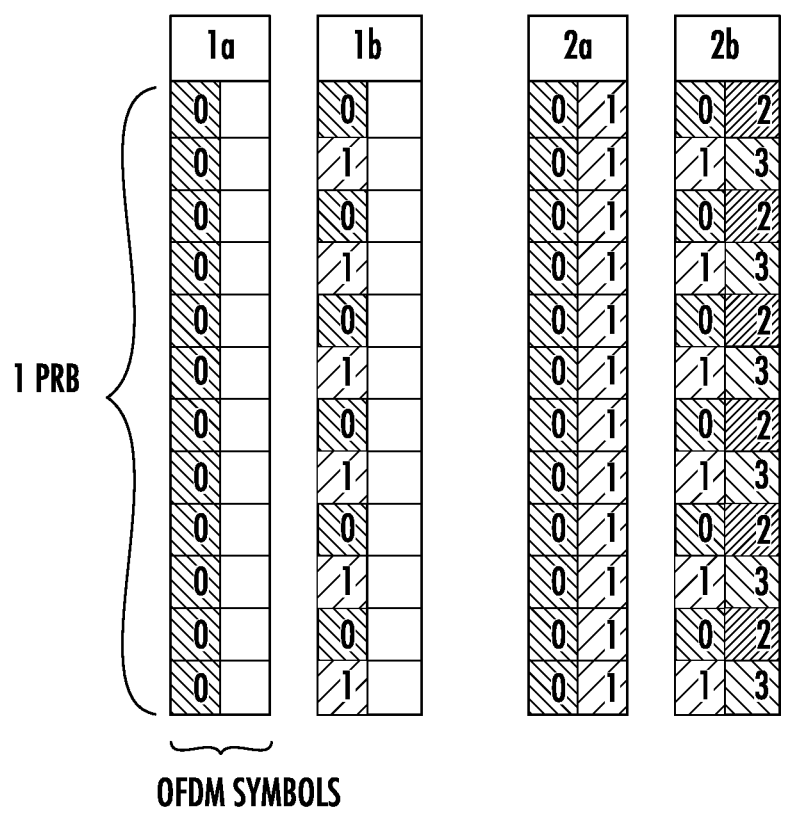
FIG. 10 is a PRB based sREG and a fractioned PRB based SREG for 1 OFDM symbol.

These two sREG configuration options are depicted in FIG. 10, considering 1 OFDM symbol sPDCCH (options 1a and 1b) with 6 REs per sREG and 2 OFDM symbol sPDCCH (options 2a and 2b) with 12 REs per sREG. Each index, i.e. {0, 1, 2, 3}, represents an sREG group. Thus, as depicted, for 1 OFDM symbol sPDCCH, up to two sREG groups can be configured and for 2 OFDM symbol sPDCCH up to four sREG groups. It can be seen that a sREG only spans a single OFDM symbol. As such, the sREG is spanning only one OFDM symbol in the time domain. This enables easy extension of the sPDCCH design to more OFDM symbols in the time domain. Following this principle (i.e., only one OFDM symbol spanned by a sREG, i.e., the sREG has a time domain length of only one OFDM symbol, which is applicable to any example), one can consider the alternative fractioned PRB based sREG in which resource elements of a OFDM symbol would be split into more than two sREG for instance. But one way to achieve a design adaptable to different number of OFDM symbols is apply a condition that a sREG only spans a single OFDM symbol.

In another embodiment, 1 OFDM symbol sPDCCH is defined for CRS based transmissions due to the advantage of early decoding for 2 OFDM symbol sTTI, while 2 or more OFDM symbol sPDCCH can be configured for one slot length TTI. As an alternative for 2 OFDM symbol sTTI configuration, 2 or more OFDM symbol sPDCCH can be used to allow a small sTTI band, i.e., to limit the number of frequency resources used for sTTI operation.

In a further embodiment, for DMRS based transmissions with 2 OFDM symbol sTTI, assuming a design based on DMRS pairs in the time domain as in legacy LTE, a 2 OFDM symbol sPDCCH is defined. A 2 OFDM symbol sPDDCH is defined since wireless devices wait for the end of sTTI for channel estimation. In such case, DMRS is not shared between sPDCCH and sPDSCH in a given PRB of the sTTI. This gives more freedom for applying beamforming for sPDCCH. For DMRS with 1-slot sTTI, a 2 symbols sPDCCH is suitable. One DMRS pair for 1-slot TTI is preferred to be able to perform channel estimation for sPDCCH and early sPDCCH decoding.

Thereby, considering the presence of potential reference signals in a sTTI such as DMRS, CRS or CSI-RS, those REs occupied by these signals within a PRB are not used for a given sREG.

The number of sREG required to build up a sCCE for a given sPDCCH can vary, as well as their placement scheme among the frequency resources used for sTTI operation. Thus, in one embodiment, a sCCE is defined to be composed ideally by 36 REs like an eCCE or a CCE. For that, a sCCE is composed by either PRB based sREG or fractioned PRB based sREG relying on the number of OFDM symbols assigned for sPDCCH as further described below.

In order to support good frequency diversity or a more localized placement, localized and distributed placement schemes of sREG building up the same sCCE are defined:
Localized scheme: sREGs building the same sCCE can be localized in frequency domain to allow for a sPDCCH resource allocation confined in a limited frequency band. This facilitates the use of beamforming for DMRS based sPDCCH.
Distributed scheme: A distributed sREG location can be used to allow frequency diversity gains. In this case, multiple wireless devices may have the sREG of their sPDCCH mapped to the same PRB on different REs. Distributing over a wide frequency range also more easily makes the sPDCCH fit into one single OFDM symbol. For wireless devices with DMRS based demodulation, user-specific beamforming is not recommended with distributed sCCE locations.

In a further embodiment, these schemes, which are described below for building sCCE based on 1 OFDM symbol sPDCCH and 2 OFDM symbol sPDCCH, can be used for CRS and DMRS transmissions.

Likewise, some embodiments take into account the following considerations:
CRS and DMRS users can coexist on the same sTTI, since sPDCCH design is the same.
If both CRS and DMRS users are given downlink control information (DCI) in the same PRB, this may be indicated to CRS users. Then, the CRS users know that some REs are not used for sCCE. Otherwise, CRS and DMRS users may be sent DCI in different PRBs.

At least one set of PRBs that can be used for the sPDCCH is configured per user. It is recommended to support the configuration of several sets of PRBs used for sPDCCH so as to configure one set of PRBs following the localized sPDCCH mapping and another set with the distributed mapping. The wireless device can monitor both sets and the network node, could select the most favorable configuration/PRB set for a given sTTI and wireless device.

In an embodiment, the set of PRBs assigned for the sPDCCH, which includes PRBs (not necessarily consecutive) from the available sTTI band, may be configured via higher layer signaling such as radio resource control (RRC) signaling. However, this may require a potential resource allocation refinement in the slow downlink control information (DCI) transmitted in PDCCH, e.g., a reduced set of PRBs or a specific set in case several sPDCCH sets were defined. For some of the schemes described herein, and for simplicity, a system bandwidth of 10 MHz (i.e. 50 PRBs) is assumed, of which a set of 18 PRBs (not necessarily consecutive physical PRBs) is assigned by the network node, for sPDCCH. All the schemes however can further comprise all system bandwidths.

In an embodiment, the set of PRBs are configured independently, e.g., as a PRB bitmap. In another embodiment, the set is configured based on groups of PRBs. One example of an already-defined group of PRBs in LTE is called resource block group (RBG) and can be used as a basis in the proposed sPDCCH mapping. Then, all PRBs within the same PRB group, e.g., RBG, may be jointly used.

In an embodiment, the PRBs or groups of PRBs included in the configured PRB set may be ordered according to a sequence signaled to the wireless device before mapping the sPDCCH to them.

Figure 11:
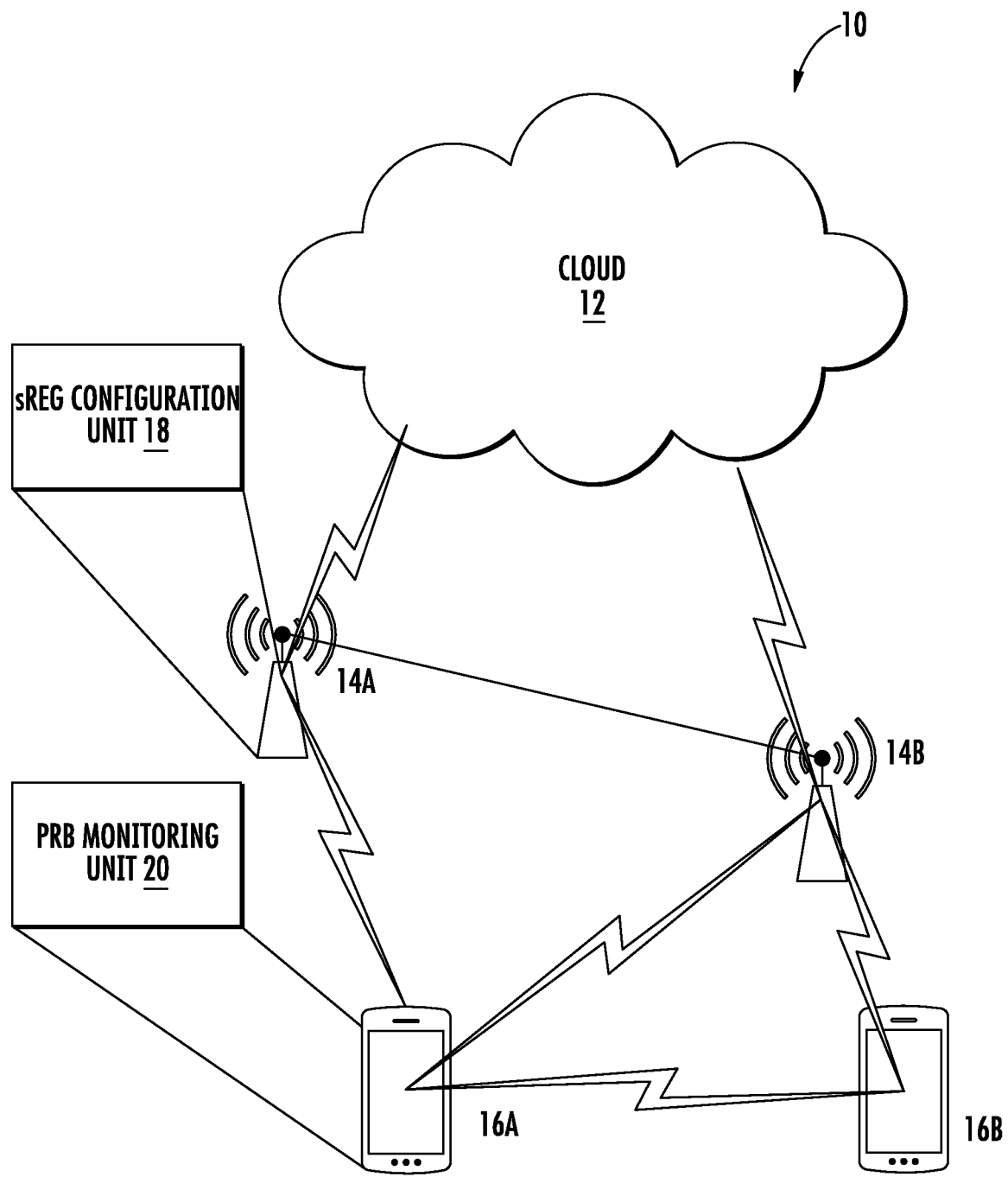
FIG. 11 is a block diagram of a wireless communication system constructed in accordance with principles set forth herein.

FIGS. 11-17 depict hardware and flowcharts that implement the features described above. FIG. 11 is a block diagram of a wireless communication system 10 constructed according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection.

The network node 14 includes an sREG configuration unit 18 configured to configure short resource element groups, sREGs, within a physical resource block, PRB, each sREG spanning one OFDM symbol. In some aspects, and in any example, the sREGs being within a PRB corresponds to the sREGs having a size in the frequency domain which is equal to the frequency domain size of one PRB, e.g. 12 subcarriers. In some aspects, each sREG extends in frequency over one PRB. The wireless device 16 includes a PRB monitoring unit 20 configured to monitor a plurality of sets of PRBs used for the sPDCCH, at least one set configured for localized sPDCCH mapping to resource elements and at least another set configured for distributed sPDCCH mapping to resource elements.

Figure 12:
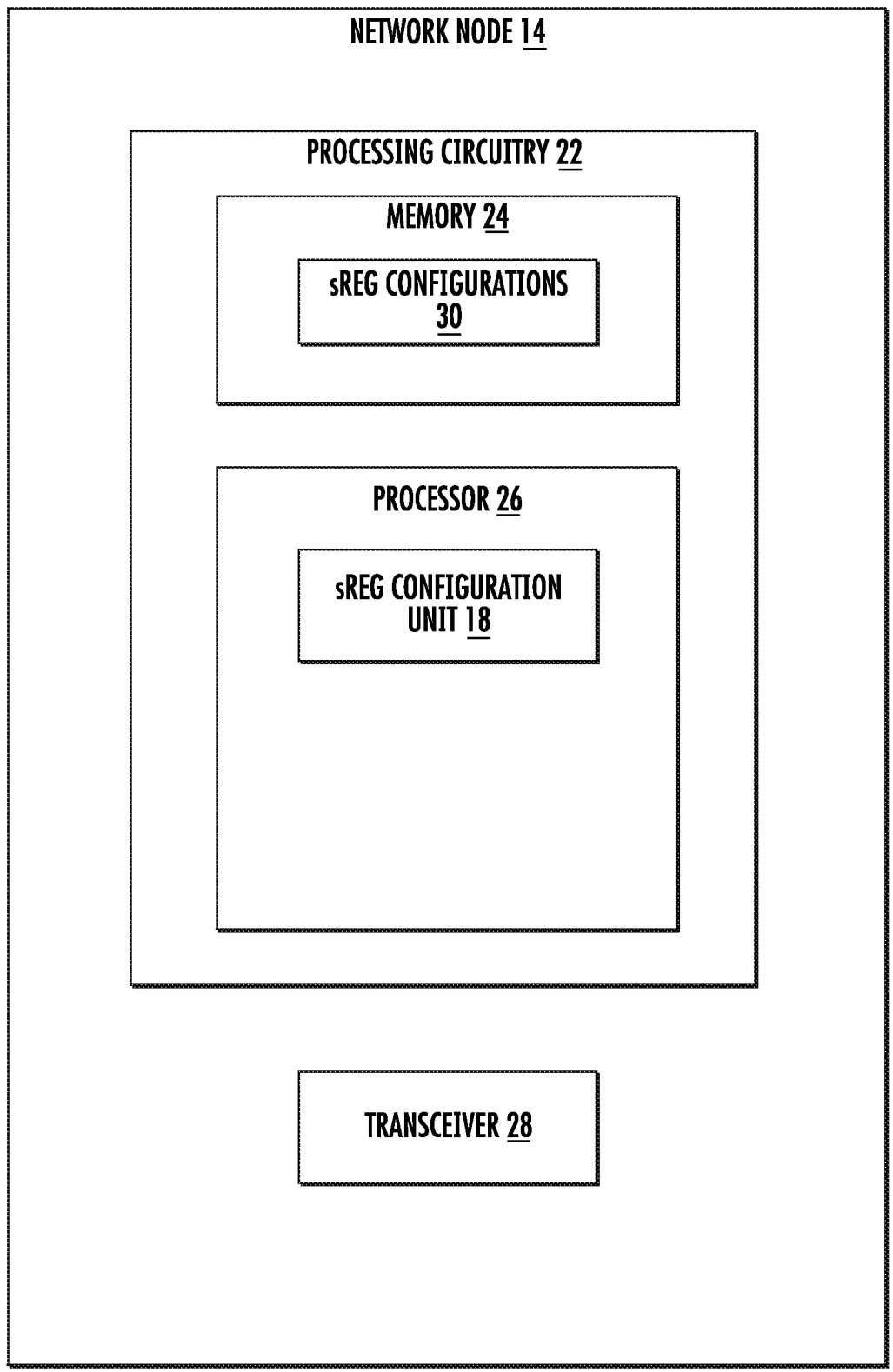
FIG. 12 is a block diagram of a network node constructed in accordance with principles set forth herein.

FIG. 12 is a block diagram of a network node 14 for mapping an sPDCCH to resource elements of a time-frequency grid as discussed above. The network node 14 has processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 32 includes or may be connected or connectable to memory, which may be configured to be accessible for reading and/or writing by the controller and/or processing circuitry 22.

The memory 24 is configured to store sPDCCH mappings. The processor 26 includes a sREG configuration unit 18 configured to configure short resource element groups, sREGs, within a physical resource block, PRB, the number of sREGs depending upon a number of orthogonal frequency division multiplex, OFDM, symbols of the sPDCCH, each sREG spanning one OFDM symbol. The network node 14 also includes a transceiver 28 configured to transmit the sPDCCH to a wireless device 16.

Figure 13:
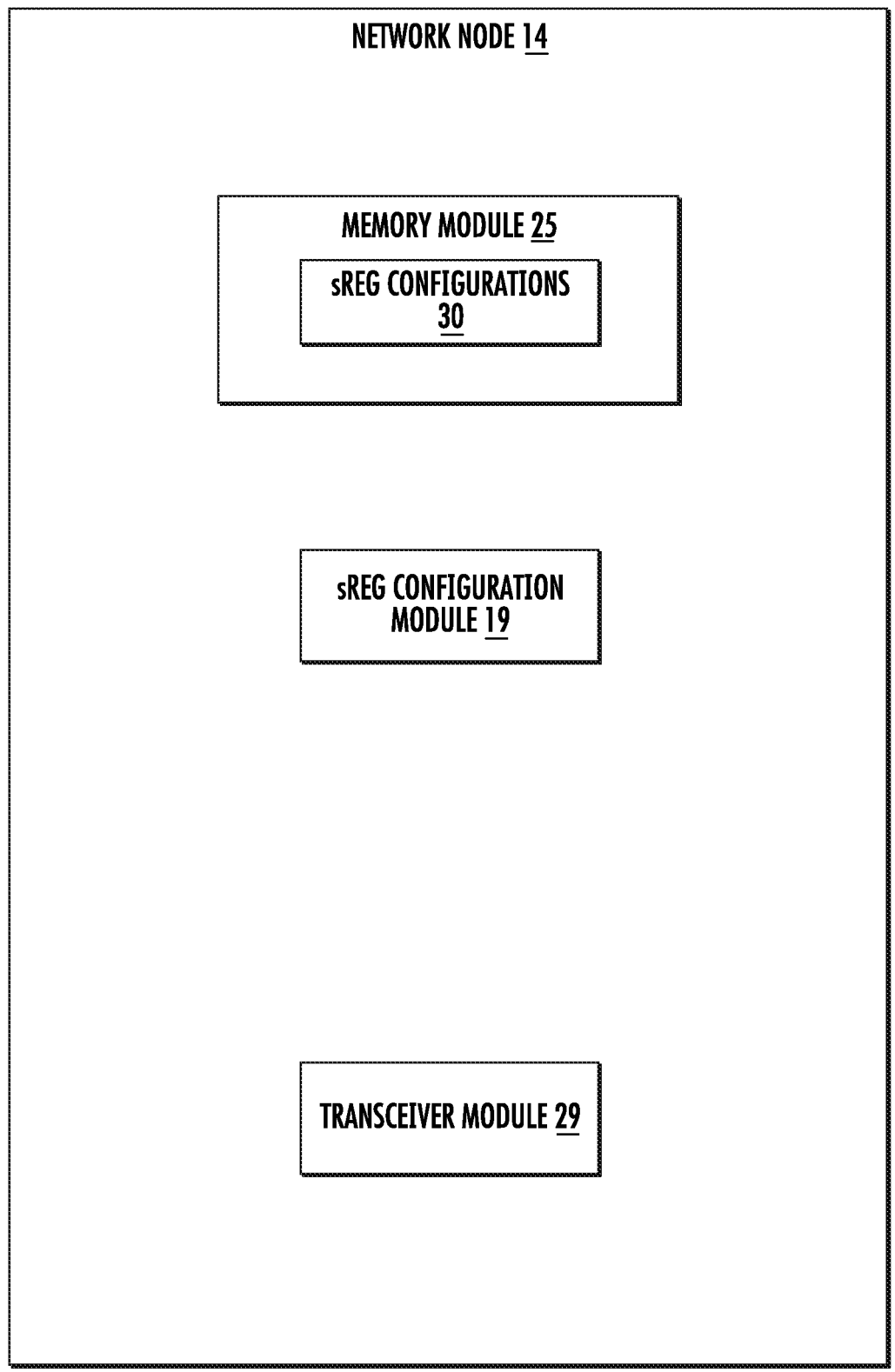
FIG. 13 is a block diagram of an alternative embodiment of a network node.

FIG. 13 is a block diagram of an alternative embodiment of a network node 14 that includes a memory module 25, an sREG configuration module 19 and a transceiver module 29. The sREG configuration module 19 may be implemented in software executed by a processor to configure short resource element groups, sREGs, within a physical resource block, PRB. The transceiver module 29 may be implemented at least in part by software that may be executed by the processor to transmit the sPDCCH to the wireless device 16.

Figure 14:
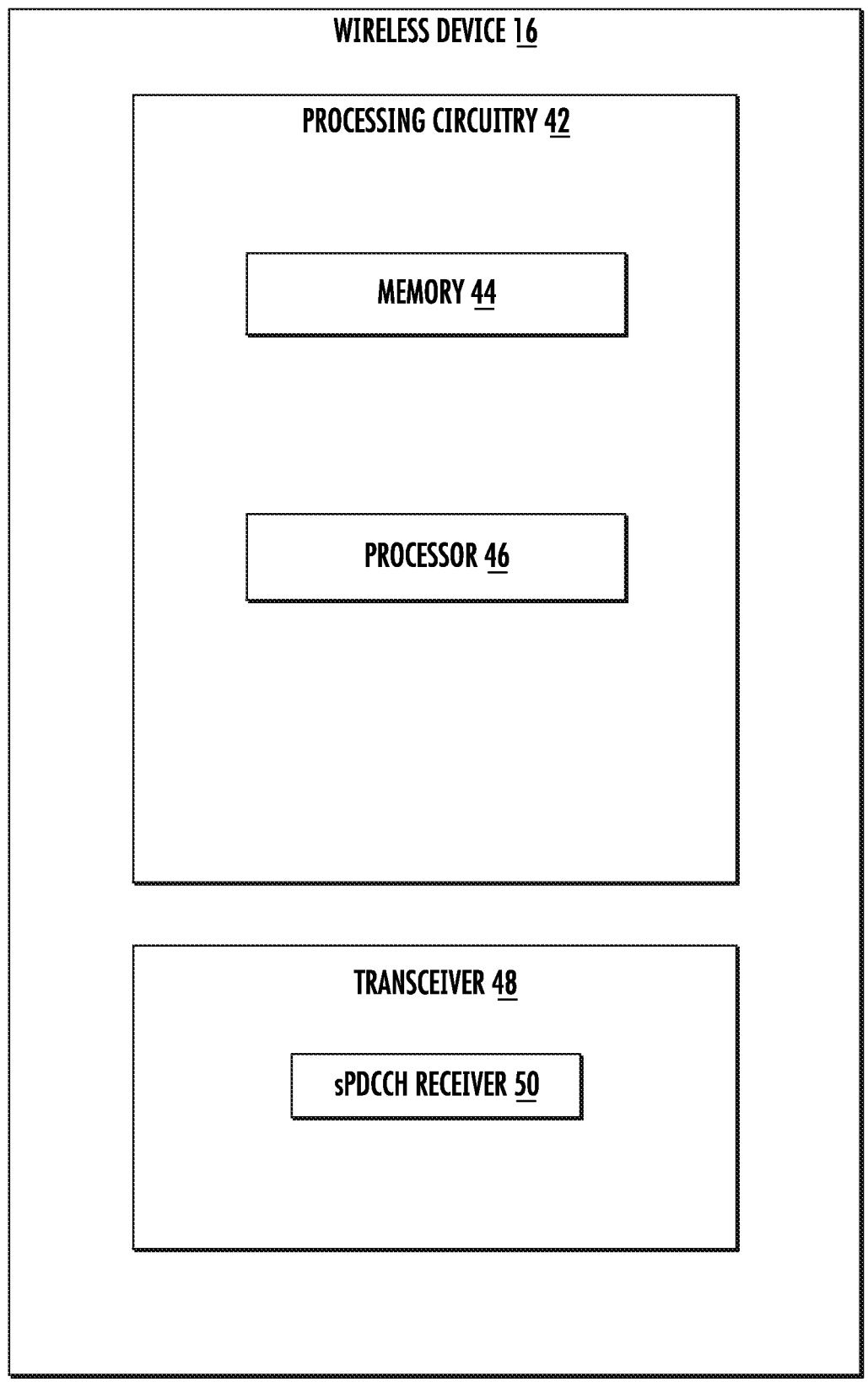
FIG. 14 is a block diagram of a wireless device constructed in accordance with principles set forth herein.

FIG. 14 is a block diagram of a wireless device 16. The wireless device 16 has processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store the sPDCCH. The wireless device 16 also includes a transceiver 48 which includes an sPDCCH receiver 50 configured to receive the sPDCCH from the network node 14 on one of a plurality of sets of PRBs.

Figure 15:
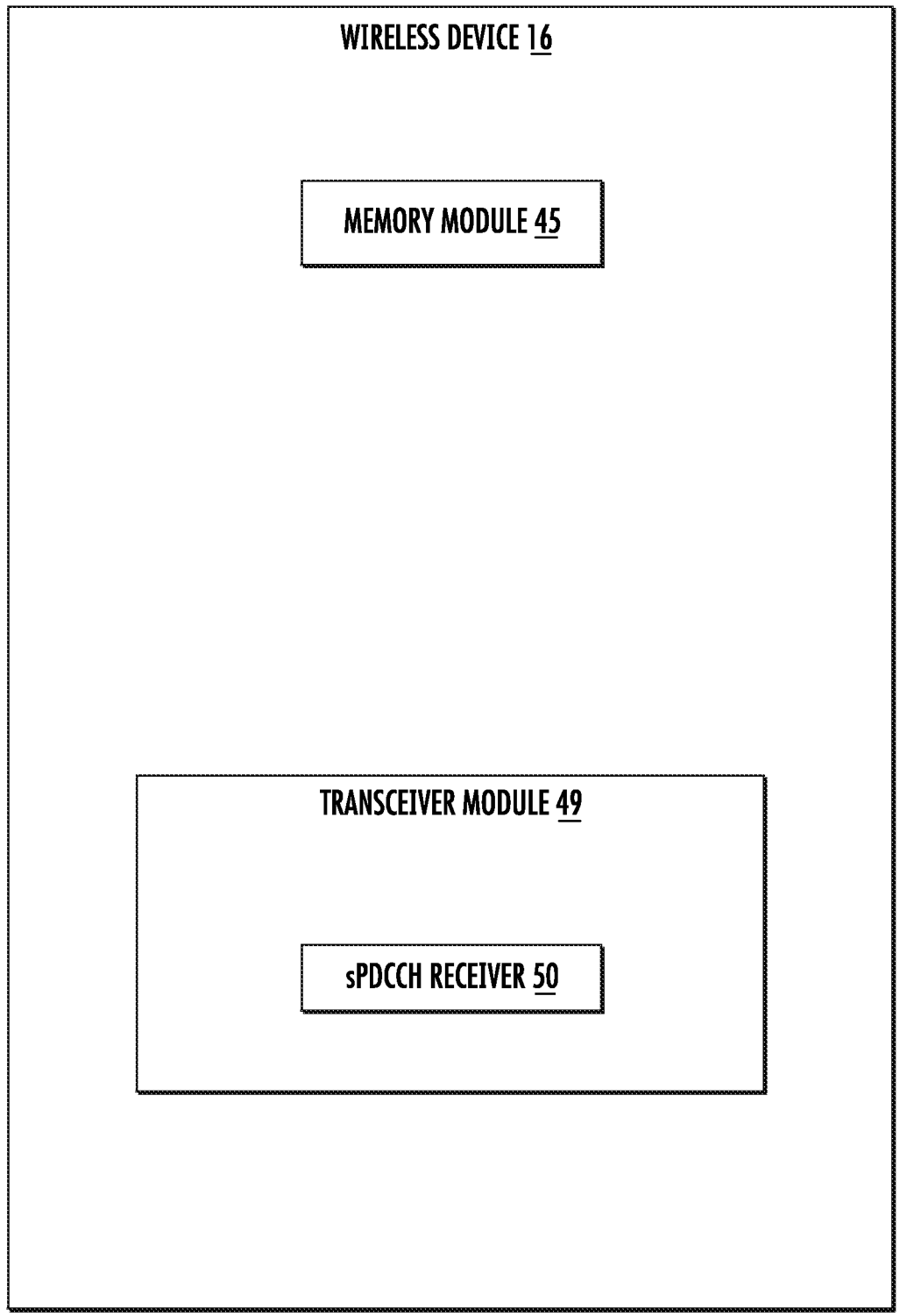
FIG. 15 is a block diagram of an alternative embodiment of a wireless device.

FIG. 15 is a block diagram of an alternative embodiment of a wireless device 16 that includes a transceiver module 49 includes the sPDCCH receiver 50 which may be implemented in part by software executable by a processor.

Figure 16:
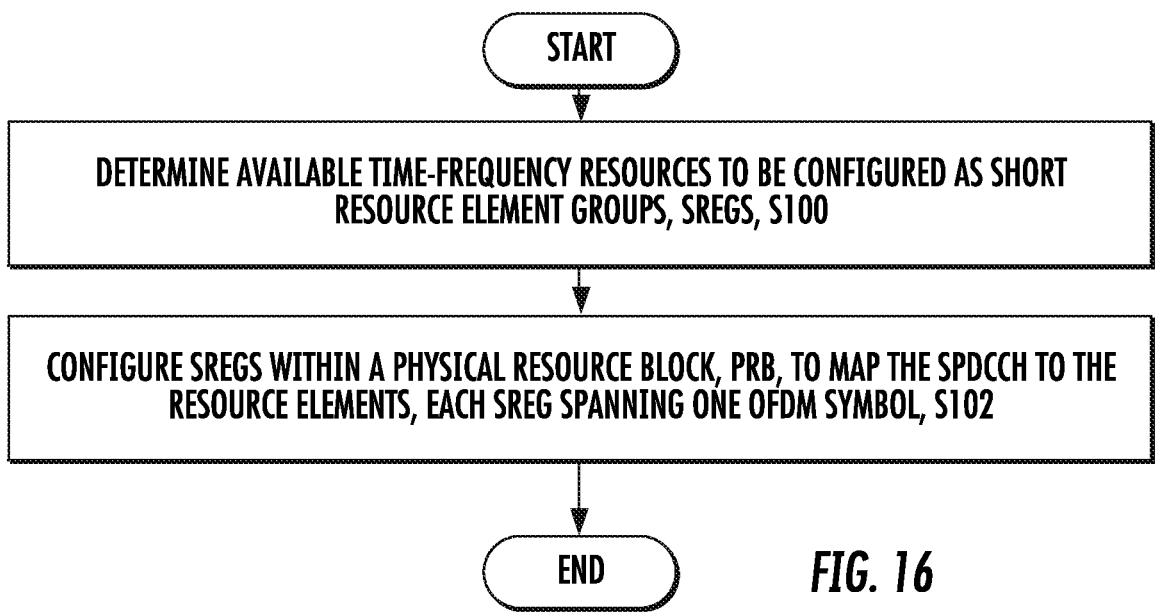
FIG. 16 is a flowchart of an exemplary process in a network node.

FIG. 16 is a flowchart of an exemplary process for mapping an sPDCCH to resource elements of a time-frequency grid. The process includes determining available time-frequency resources to be configured as sREGs (block S100). The process also includes configuring, via the sREG configuration unit 18, the sREGs within a PRB, to map the sPDCCH to the resource elements (block S102). In some embodiments, the number of sREGs depending upon a number of OFDM symbols of a sPDCCH. Also note that in some embodiments, the size of the sREG in the frequency domain is equal to 1 PRB which may be equal to 12 subcarriers.

Figure 17:
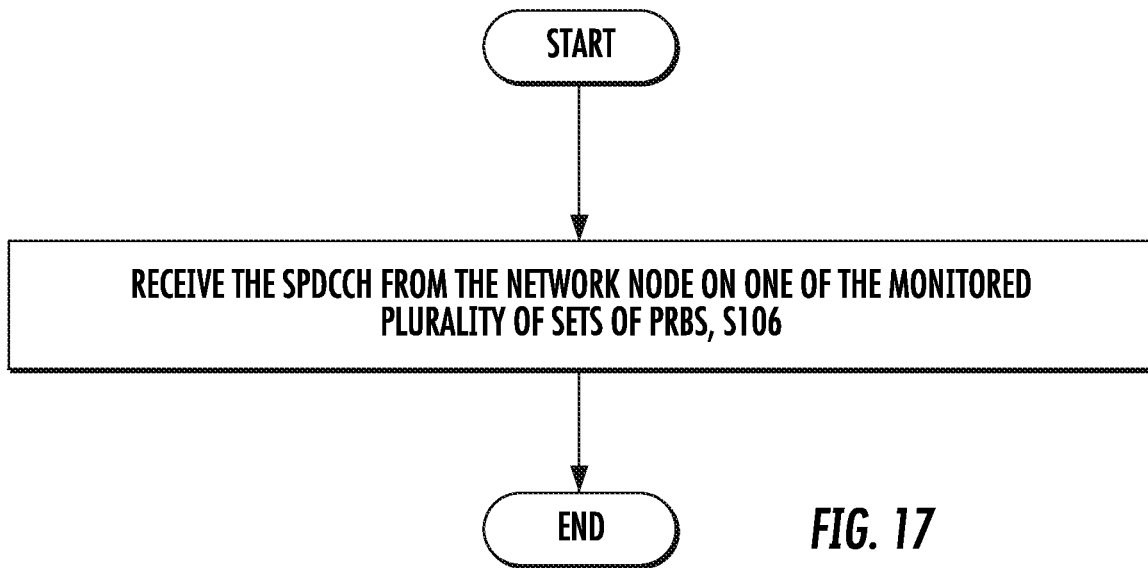
FIG. 17 is flowchart of an exemplary process for ascertaining a sPDCCH at a wireless device.

FIG. 17 is a flowchart of an exemplary process for mapping an sPDCCH to resource elements of a time-frequency grid. The process includes receiving, via the receiver 50, the sPDCCH from the network node 14 on one of a plurality of sets of PRBs (block S106).

Figure 18:
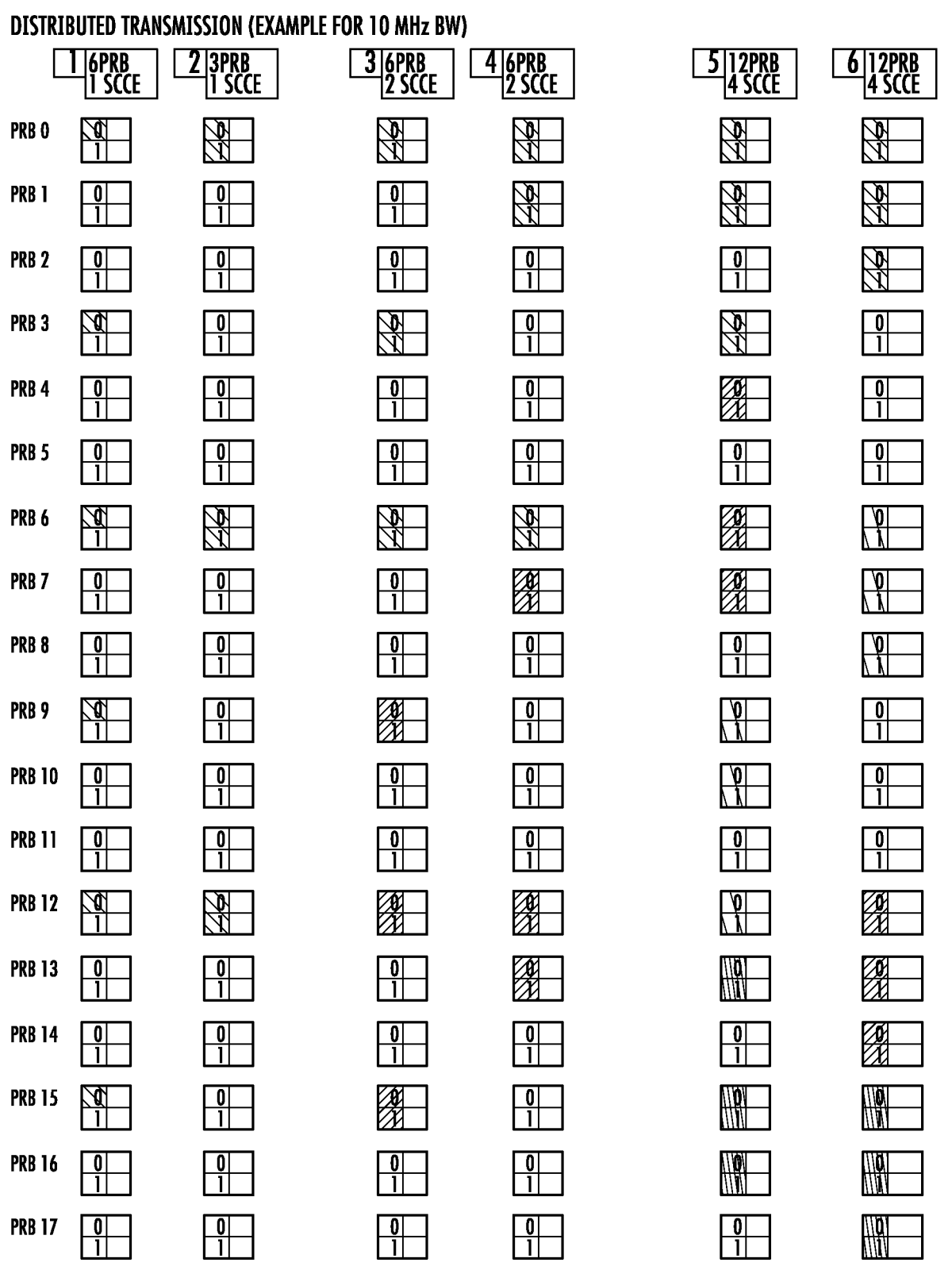

In some embodiments, distributed cases are defined and depicted in FIG. 18, which shows a 1-OFDM symbol sPDCCH distributed scheme for a set of 18 PRBs. These cases include an aggregation level of up to 4 (i.e., up to 4 sCCE per sPDCCH). Higher aggregation levels are possible as well. These cases aim at regular distribution of the sREG over the PRBs of the configured PRB set in the frequency domain. Some embodiments have the features that the unused PRBs shown in FIG. 18 can be further assigned for building other sCCEs for other wireless devices 16. Further, these unused PRBs may be used for sPDSCH allocation. The PRB indices shown in FIG. 18 represent the number of the sREG group within the sPDCCH PRB set (for this example, a set of 18 PRBs). For simplicity, the physical PRB number is not shown.

The aggregation level (AL) 1 (i.e., 1 sCCE=36 REs) comprises two cases as depicted in FIG. 18, where the differently shaded regions represent different sCCEs:

Case 1 (AL 1) (denoted by the numeral 1 at the top of column 1): Fractioned PRB based sREG with a sREG=6 REs. Thereby, the sCCE is composed of 6 sREG highly and regularly distributed in the frequency domain, providing high frequency diversity. For that, 6 PRBs are used. This case may further comprise an offset to be signaled or computed to use sREG group 1 instead of sREG group 0. This allows efficient PRB utilization by sharing the PRB resources between (up to) two users.

Case 2 (AL 1) (denoted by the numeral 2 at the top of column 2): PRB based sREG, i.e., 1 sREG=12 REs (sREG group 0 and 1 together are seen as a single sREG in FIG. 18), or fractioned PRB based sREG with full PRB utilization, i.e. including sREG group 0 and sREG group 1 from each assigned PRB. Thereby, the sCCE is composed of either 3 PRB based sREG or 6 fractioned PRB based sREG moderately and regularly distributed in the frequency domain, i.e. over 3 PRBs. Thus, frequency diversity is still provided.

The choice of using, sREG group 0 or sREG group 1 in FIG. 18 can, as mentioned above, be signaled or calculated. It can also be standardized or signaled that the wireless device 16 should monitor a set of sREG, thereby increasing the search space but allowing for the network node 14 to send sPDCCH to multiple wireless devices 16 sharing the same set of configured PRBs.

The aggregation levels (ALS) 2 (i.e. 2 sCCE) and 4 (i.e. 4 sCCE) comprise four cases. These cases are depicted in FIG. 18, where areas in FIG. 18 that are shaded differently represent different sCCEs.

Case 3 (AL 2) (denoted by the numeral 3 at the top of column 3): An extension of Case 1 with full PRB utilization, i.e., including sREG group 0 and sREG group 1 from each assigned PRB. Likewise, this case can be based on PRB based sREG. Thereby, the sCCE is composed of either 6 PRB based sREG or 12 fractioned PRB based sREG that are highly and regularly distributed in the frequency domain, i.e., over 6 PRBs. In some aspects, this case uses 6 sREG each of one full PRB, or using 12 sREG each of one fractioned PRB. So aspects are applicable to either definition of sREG size. This is in contrast to case 1, which is only applicable for fractioned PRB.

Case 4 (AL 2) (denoted by the numeral 4 at the top of column 4): An extension of Case 2 including the consecutive PRB from each PRB used in Case 2.

Case 5 (AL 4) (denoted by the numeral 5 at the top of column 5): An extension of Case 3 including the consecutive PRB from the PRBs used in Case 3.

Case 6 (AL 4) (denoted by the numeral 6 at the top of column 6): An extension of Case 4 including the consecutive PRB from each PRB used in Case 4 as well as the last 3 PRBs within the PRB set.

As described, Case 1 and Case 2 are the basis for all schemes. Therefore, in one embodiment, the Case 1 and Case 2 distribution schemes for 1 OFDM symbol sPDCCH can be achieved by the following formula. The sREG m of a sCCE composed of N_(sREG/sCCE) is given by $$Y + \left\lceil \frac{m * N_{sREG/PRB} * N_{PRB}}{N_{sREG/sCCE}} \right\rceil, m = 0, \ldots, N_{sREG/sCCE} - 1$$

where: Y is the wireless device-dependent offset based on signalling from the network node 14, and/or pseudo-random number that may be time dependent (for the example above, it is 0 or 1), $N_{PRB}$ is the number of PRBs in the configured sPDCCH PRB set (for the example above, it is 18), $N_{sREG/sCCE}$ is the number of sREG per sCCE (described above in each case), and $N_{sREG/PRB}$ is the number of sREG assigned per PRB. This means that for fractioned PRB sREG, it is equal to 1 in Case 1 and for the other cases it is equal to 2. For PRB based sREG, it is always equal to 1.

The above formula indicates the PRB number (location within the PRB set) of each sREG that builds up a sCCE by evenly distributing them over all available $N_{sREG/PRB}*N_{PRB}$ sREG in the configured $N_{PRB}$ PRBs. In certain cases, a rougher granularity for the distribution and distribution of the sREGs over a sCCE evenly over the configured $N_{PRB}$ PRBs may be used. In this case, the equation becomes as follows.

$$Y + \left\lfloor \frac{m * N_{PRB}}{N_{sREG/sCCE}} \right\rfloor, m = 0, \ldots, N_{sREG/sCCE} - 1$$

Note that the above equations assume that the network node 14 configures a sufficient number of PRBs to achieve a PRB-based frequency distribution. Likewise, this distribution scheme can be given directly by the network node 14 providing a sequence of PRBs or a sequence of groups of PRB.

Figure 19:
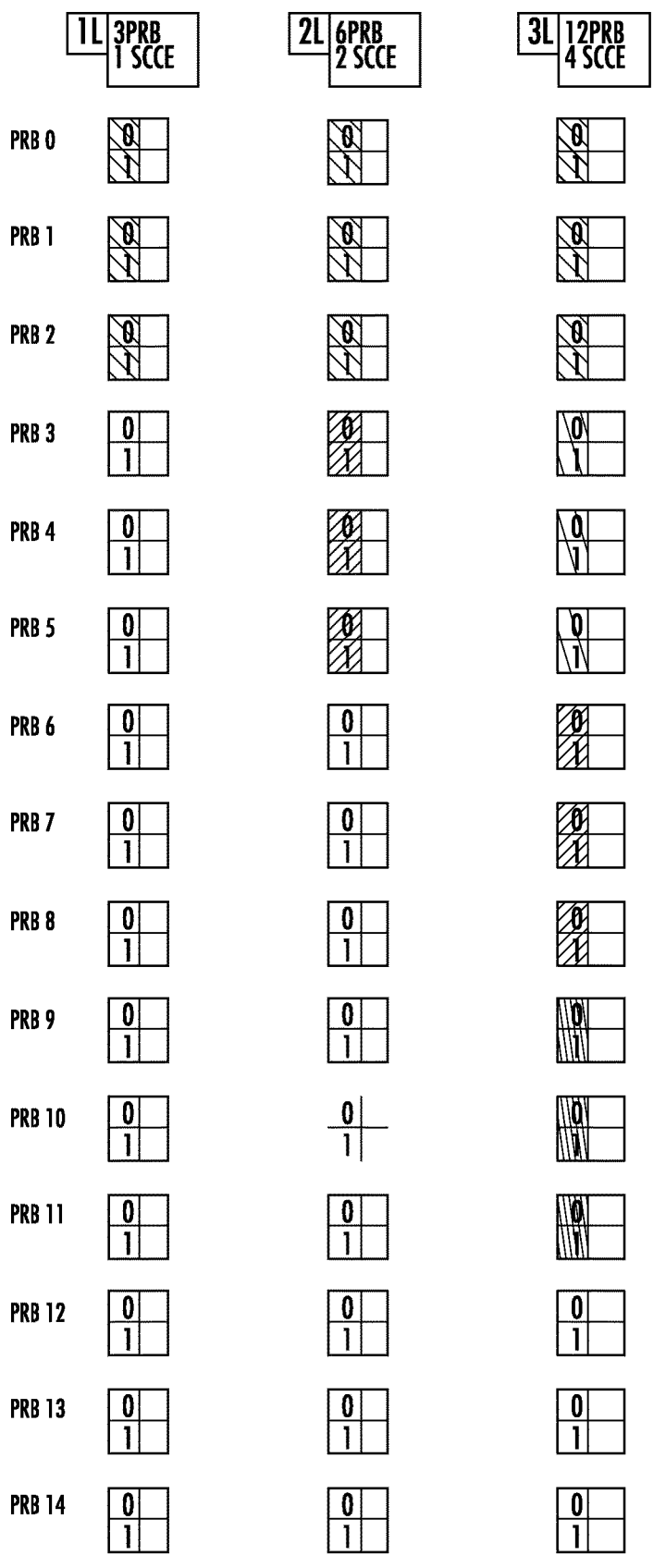

In one embodiment, the localized cases are defined and depicted in FIG. 19, wherein differently shaded regions represent different sCCEs. As depicted in FIG. 10, options 1a and 1b correspond to 1 OFDM symbol sPDCCH. FIG. 19 shows a 1-OFDM symbol sPDCCH localized scheme. For the localized scheme, the sREGs building the same sCCE are localized in the frequency domain, i.e., in consecutive PRBs, to allow for a sPDCCH resource allocation confined in a limited frequency band. This applies for PRB based sREG as well as fractioned PRB based sREG. The PRB index shown in FIG. 19 represents the number of the sREG group within the sPDCCH PRB set (for this example, a set of 18 PRBs). For simplicity, the physical PRB number is not shown.

As an example and in one embodiment, the localized scheme cases (i.e., 1L, 2L and 3L in FIG. 19) for 1 OFDM symbol sPDCCH can be achieved by the following algorithm:
Determine the number of sREGs, n_tot, needed to reach the number of REs, nr, for the given aggregation level
Initialize the set of sREG to use, S={ }
Initialize the frequency index to the frequency of the starting sREG, k=k0
While n<n_tot
For l=1 to nr of OFDM symbol available for the sPDCCH
Add sREG to S (in time domain until the nr of OFDM symbol available for sPDCCH is reached)

n=n+1

End For
k=k+1 (go to the immediately following sREG in frequency domain relying on sREG definition)
end While Note that the above algorithm assumes that n_tot is a multiple of the number of OFDM symbols available for the sPDCCH. A 2 OFDM symbol sPDCCH configuration is an extension of the 1 OFDM symbol sPDCCH configuration described above, for both distributed and localized schemes.

As depicted in FIG. 10, options 2a and 2b correspond to 2 OFDM symbol sPDCCH. Based on this, and as a further embodiment, the distributed cases are defined and depicted in FIG. 20, which shows a 2-OFDM sPDCCH distributed scheme for a set of 19 PRBs. These cases comprise an aggregation level of up to 8 (i.e., up to 8 sCCE per sPDCCH) and a regular distribution in the frequency domain. This embodiment further assumes that the unused PRBs shown in FIG. 20 can be further assigned for building other sCCE for other wireless devices 16 following the description below as well as the possibility to be used for sPDSCH allocation. For simplicity, the physical PRB number is not shown.

Figure 20:
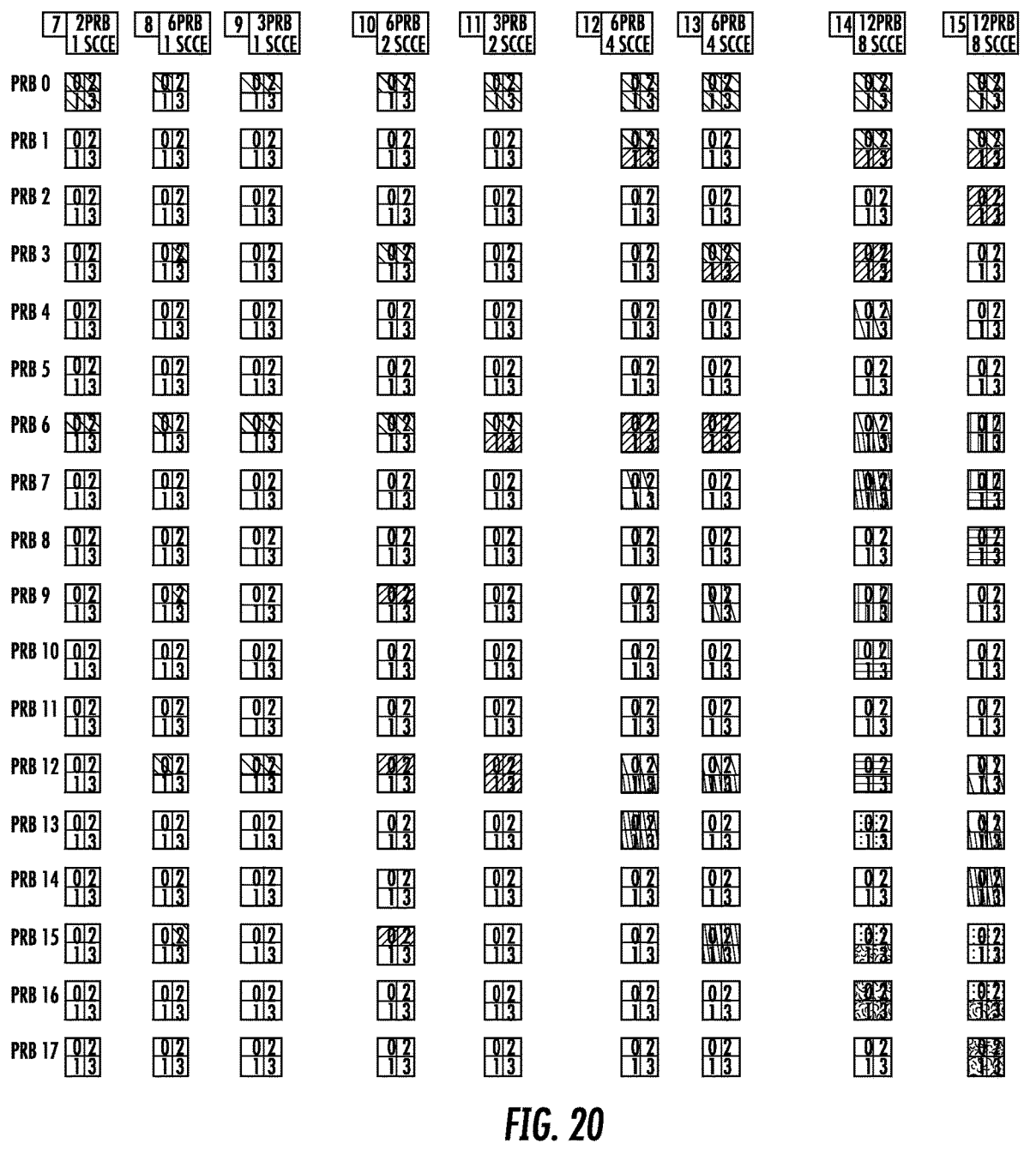

The aggregation level (AL) 1 (i.e. 1 sCCE=36 REs) comprises three cases which can be built up based on fractioned PRB sREG, as depicted in FIG. 20:

Case 7 (AL 1): Fractioned PRB based sREG, i.e. sREG=6 REs. Thereby, the sCCE is composed of 6 sREG moderately distributed in frequency domain. For that, 2 PRBs are used.

Case 8 (AL 1): Fractioned PRB based sREG. Thereby, the sCCE is composed of 6 sREG highly and regularly distributed in frequency domain. For that, 6 PRBs are used with one sREG per PRB while varying the OFDM symbol position. Thus, high frequency and time diversity are achieved. This case further includes an offset to be signaled or computed to start using sREG 2 instead of sREG 0 (or sREG group 1 or 3). This allows efficient PRB utilization by sharing the PRB resources between (up to) four users.

Case 9 (AL 1): Fractioned PRB based sREG. Thereby, the sCCE is composed of 6 fractioned PRB based sREG moderately and regularly distributed in the frequency domain, i.e. over 3 PRBs. Thus, frequency diversity is still provided. The sREG are paired in the time domain to use all OFDM symbols in the same PRB. This case further includes an offset to be signaled or computed to start using the sREG pair {1, 3} instead of sREG pair {0, 2}. This allows efficient PRB utilization by sharing the PRB resources between (up to) two users.

As depicted in FIG. 20, each differently shaded region represents a different sCCE:

Case 10 (AL 2): An extension of Case 8 by including the time domain adjacent fractioned PRB based sREG, i.e., a sREG pair in the time domain per PRB. Alternatively, this case can be built as a Case 9 extension by making a regular distribution of sREG pairs over 6 PRBs. Thereby, the sCCE is composed of sREG pairs highly and regularly distributed in the frequency domain, providing high frequency diversity. This case further comprises an offset to be signaled or computed to start using the sREG pair {1, 3} instead of sREG pair {0, 2}. This allows efficient PRB utilization by sharing the PRB resources between (up to) two users.

Case 11 (AL 2): An extension of Case 9 with full PRB utilization, i.e., including sREG pairs {0, 2} and {1, 3} from each assigned PRB. Likewise, this case can be based on PRB based sREG. Thereby, the sCCE is composed of either 6 PRB based sREG (2 sREG per PRB) or 12 fractioned PRB based sREG (4 sREG per PRB) moderately and regularly distributed in the frequency domain, i.e. over 3 PRBs. In some aspects, both 6 full-PRBs or 12 half-PRBs will provide a same or corresponding result.

Case 12 (AL 4): An extension of Case 11 including the consecutive PRB from each PRB used in Case 11.

Case 13 (AL 4): An extension of Case 10 with full PRB utilization from each assigned PRB. Likewise, it can be based on PRB based sREG. Thereby, the sCCE is composed of either 12 PRB based sREG or 24 fractioned PRB based sREG highly and regularly distributed in the frequency domain, i.e. over 6 PRBs.

Case 14 (AL 8): An extension of Case 13 including the consecutive PRB from each PRB used in Case 13.

Case 15 (AL 8): An extension of Case 12 including the consecutive PRB from each PRB used in Case 12 as well as the last 3 PRBs within the PRB set.

Figure 21:
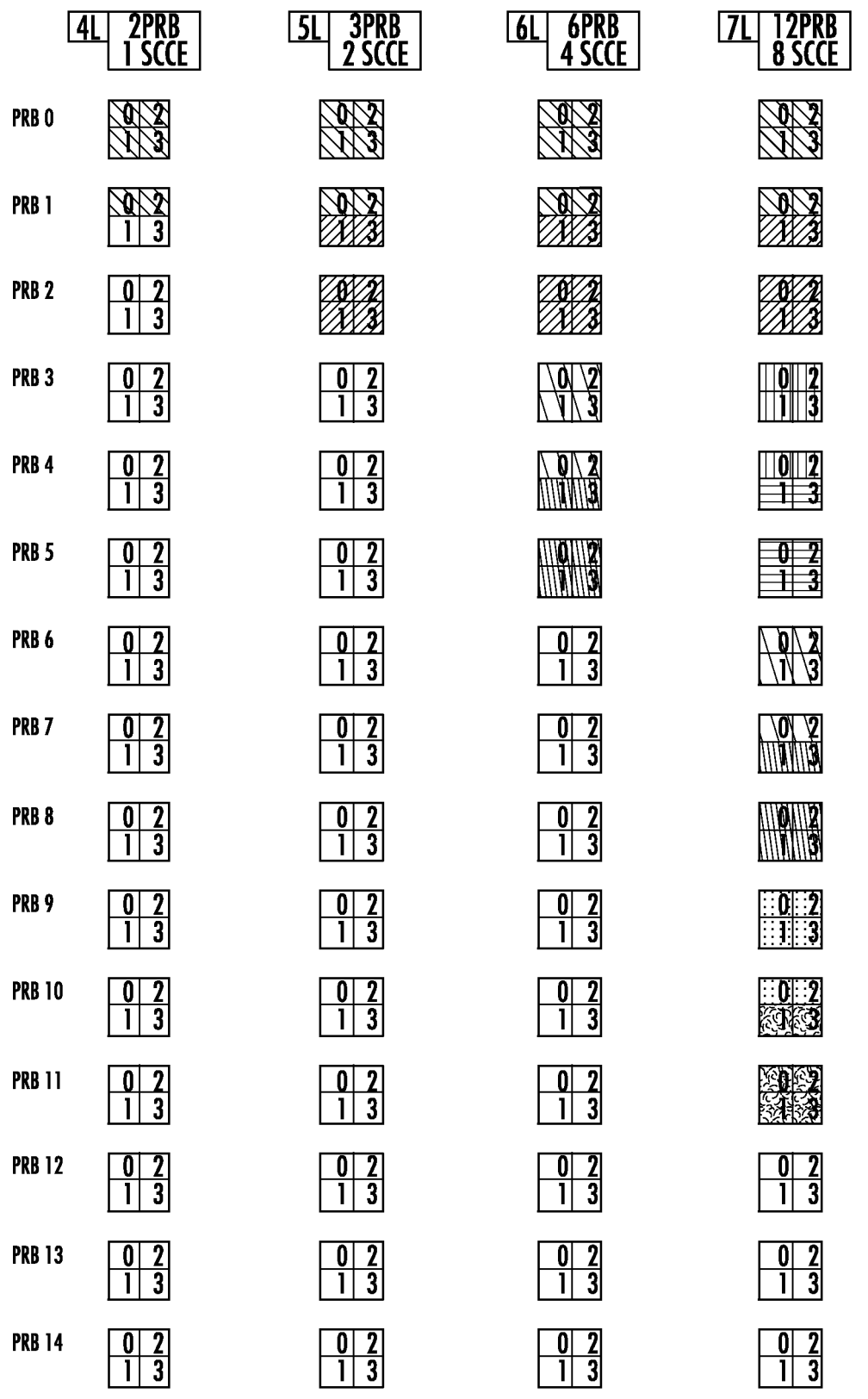

In one embodiment, the localized cases of FIG. 10, options 2a and 2b are defined and depicted in FIG. 21, which shows a 2-OFDM symbol sPDCCH localized scheme. For the localized scheme, the sREGs building the same sCCE are localized in the frequency domain, i.e., in consecutive PRBs, to allow for a sPDCCH resource allocation confined in a limited frequency band. This applies for PRB based sREG as well as fractioned PRB based sREG. The PRB index shown in FIG. 21 represents the number of the sREG group within the sPDCCH PRB set (for this example, a set of 18 PRBs). For simplicity, the physical PRB number is not shown.

Figure 22:
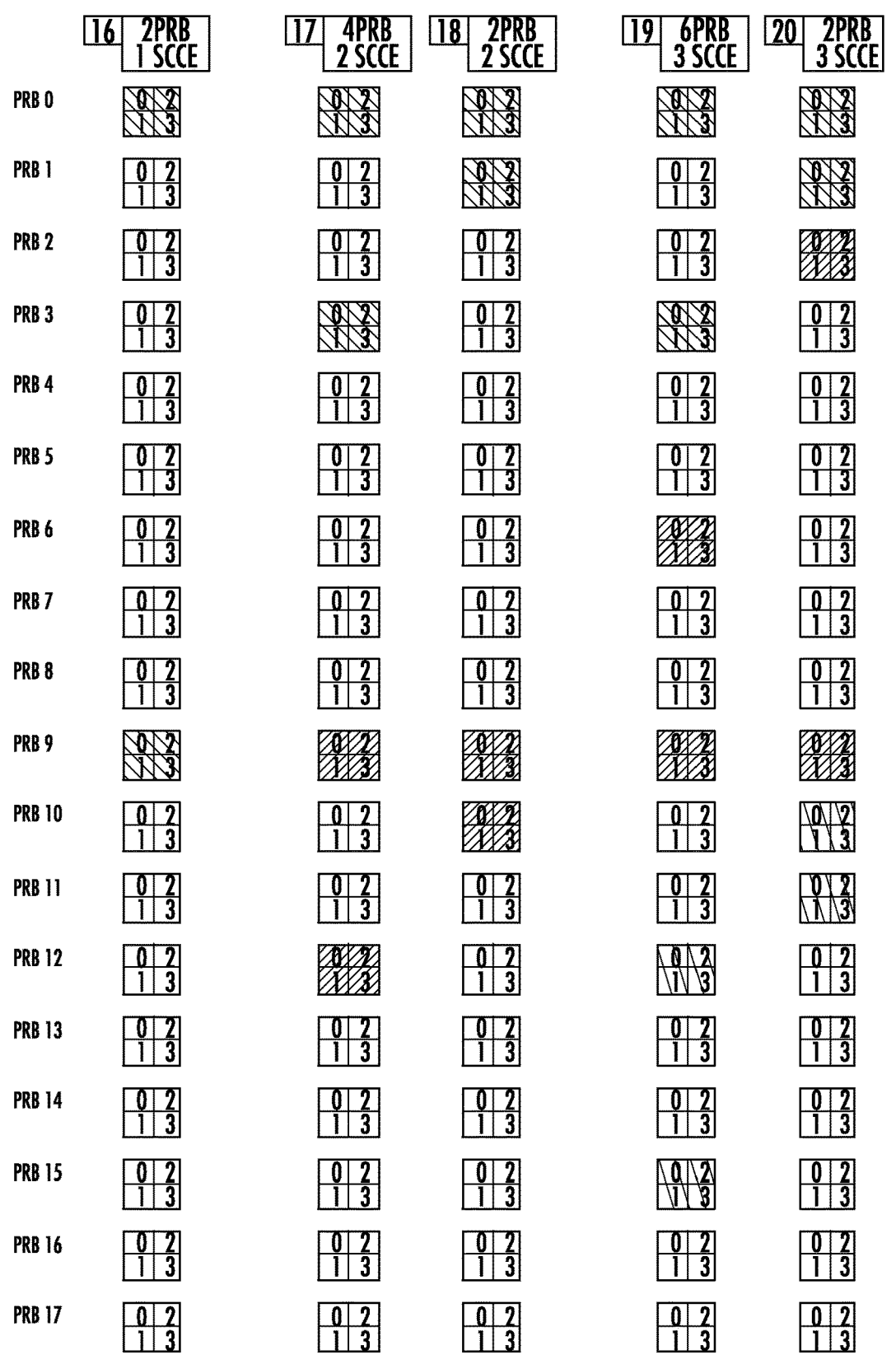

As a further embodiment, a sCCE can be defined to be composed ideally of 48 REs instead of 36 REs. Therefore, for 2 OFDM symbol sPDCCH, a sCCE is composed of either 2 PRB based sREG, i.e., 1 sREG=1 PRB=48 REs, or 8 fractioned PRB based sREG, i.e., 1 sREG=6 REs (4 sREG per PRB). Thus, a full PRB is utilized for the same user. Besides, an aggregation level of 3 sCCE can be further considered. These cases are depicted in FIG. 22 which shows an additional 2-OFDM symbol sPDCCH distributed scheme for a set of 18 PRBs.

These cases comprise a regular distribution in the frequency domain. One embodiment further provides that the unused PRBs shown in FIG. 22 can be further assigned for building other sCCE for other wireless devices 16 as well as the possibility to be used for sPDSCH allocation. The PRB index shown in FIG. 22 represents the number within the sPDCCH PRB set (for this example, a set of 18 PRBs). For simplicity, the physical PRB number is not shown.

In some cases, one subframe cannot be divided into short TTIs each of length 2 symbols. Then, the subframe may be chosen such that one or more of the TTIs are in fact of length 3. In one embodiment, the third symbol will have sREGs with index 4 and 5, extending case 2b of FIG. 10. In another embodiment, the same number of sREGs are used, and the third symbol will have sREG with index 2 or3, identical to the second symbol in case 2b of FIG. 10, and the sREG with index 2 and three will then consist of double number of REs In summary, a flexible mapping for sPDCCH to the resource elements (REs) is proposed. The mapping has various modes, each enabling exploitation of the channel or the advanced transmission modes. In one mode, large frequency diversity is achieved. In another mode condensed frequency allocation for a beamforming based transmission mode is enabled. The proposed mapping also can be extended to various number of OFDM symbols. With the proposed mapping, users with transmission modes relying on different reference signals, e.g. CRS and DMRS users, can coexist on the same sTTI.

Thus, according to one aspect, a method in network node 14 for mapping a short physical downlink control channel (sPDCCH) to resource elements of a time-frequency grid is provided. The method includes determining available time-frequency resources to be configured as short resource element groups (sREGs) (S100). The method also includes configuring sREGs within a physical resource block (PRB), to map the sPDCCH to the resource elements, each sREG spanning one OFDM symbol (S102). In any aspect, the spanning of one OFDM symbol refers to a time domain, e.g. the sREG is on a length of time of only one symbol. In any aspect, the sREG being within a PRB may refer to the sREG in the frequency domain, e.g. having a frequency extent or number of subcarriers which is one PRB.

According to this aspect, in some embodiments, an sREG consists of 1 PRB within 1 OFDM symbol including REs for at least one of cell-specific reference signal (CRS), and demodulation reference signals (DMRS) applied to DMRS-based sPDCCH. In some embodiments, an sREG consists of 1 PRB within 1 OFDM symbol including REs for at least one of CRS, and DMRS, applied to CRS-based sPDCCH. In some embodiments, the sREGs are configured to be one of localized in a frequency domain (to facilitate beam forming) and distributed in the frequency domain (to achieve frequency diversity gain). In some embodiments, the method further includes configuring a wireless device 16 by radio resource control (RRC) signaling to use a CRS, based sPDCCH resource block set with one of distributed or localized mapping of short control channel elements (sCCE), to sREGs. In some embodiments, the method further includes configuring a wireless device 16 by RRC signaling to use a DMRS based sPDCCH resource block set with one of distributed or localized mapping of sCCE to sREGs. In some embodiments, the method further includes configuring an sPDCCH PRB set with at least a set of PRBs and one of localized and distributed sCCE to sREG mapping. In some embodiments, 1 OFDM symbol sPDCCH is defined for CRS based transmissions. In some embodiments, for CRS based sPDCCH, with 2 or 3 sPDCCH symbol short transmission time intervals (sTTI), a number of OFDM symbols per RB set is one of 1 and 2. In some embodiments, for CRS based sPDCCH, with 1 slot (sTTI), a number of OFDM symbols per RB set is one of 1 and 2. In some embodiments, a 2 OFDM symbol sPDCCH is defined for DMRS-based transmissions. In some embodiments, for DMRS based sPDCCH, with 2 sPDCCH symbol sTTI, a number of OFDM symbols per RB set is 2. In some embodiments, for DMRS based sPDCCH, with 3 symbol sTTIs, a number of OFDM symbols per RB set is 3. In some embodiments, for DMRS based sPDCCH, with 1 slot sTTIs, a number of OFDM symbols per RB set is 2.

According to another aspect, a network node 14 for mapping a short physical downlink control channel, sPDCCH, to resource elements of a time-frequency grid is provided. The network node 14 includes processing circuitry 22 configured to determine available time-frequency resources to be configured as short resource element groups, sREGs. The processing circuitry 22 is further configured to configure sREGs within a physical resource block, PRB, to map the sPDCCH to the resource elements, each sREG spanning one OFDM symbol.

In some embodiments, an sREG consists of 1 PRB within 1 OFDM symbol including REs for at least one of CRS and DMRS applied to DMRS-based sPDCCH. In some embodiments, an sREG consists of 1 PRB within 1 OFDM symbol including REs for at least one of CRS and DMRS applied to CRS-based sPDCCH. In some embodiments, the sREGs are configured to be one of localized in a frequency domain and distributed in the frequency domain. In some embodiments, the processing circuitry 22 is further configured to configure a wireless device 16 by RRC signaling to use a CRS based sPDCCH resource block set with one of distributed or localized mapping of short control channel elements (sCCE) to sREGs. In some embodiments, the processing circuitry 22 is further configured to configure a wireless device 16 by RRC signaling to use a DMRS based sPDCCH resource block set with one of distributed or localized mapping of sCCE to sREGs. In some aspects, the distributed/localized mapping is of a plurality of sREGS (each being 1 PRB in frequency) to a sCCE. In some embodiments, the processing circuitry 22 is further configured to configure an sPDCCH PRB set with at least a set of PRBs, and one of localized and distributed sCCE to sREG mapping. In some embodiments, 1 OFDM symbol sPDCCH is defined for CRS based transmissions. In some embodiments, for CRS based sPDCCH, with 2 or 3 sPDCCH symbol sTTI, a number of OFDM symbols per RB set is one of 1 and 2. In some embodiments, for CRS based sPDCCH, with 1 slot sTTI, a number of OFDM symbols per RB set is one of 1 and 2. In some embodiments, a 2 OFDM symbol sPDCCH is defined for DMRS-based transmissions. In some embodiments, for DMRS-based sPDCCH, with 2 sPDCCH symbol sTTI, a number of OFDM symbols per RB set is 2. In some embodiments, for DMRS-based sPDCCH, with 3 symbol sTTI, a number of OFDM symbols per RB set is 3. In some embodiments, for DMRS-based sPDCCH, with 1 slot sTTI, a number of OFDM symbols per RB set is 2.

According to another aspect, a network node 14 for mapping a short physical downlink control channel (sPDCCH), to resource elements of a time-frequency grid to achieve one of high frequency diversity and condensed frequency allocation. The network node 14 includes a memory module 45 configured to store a mapping of the sPDCCH to resource elements of a time-frequency grid. The network node 14 further includes a short resource element group (sREG) configuration module 19 configured to configure sREGs within a physical resource block, PRB, to map the sPDCCH to the resource elements, each sREG spanning one OFDM symbol.

According to yet another aspect, a method in a wireless device 16 for receiving information on a short physical downlink control channel (sPDCCH) signaled by a network node 14, the sPDCCH being mapped to resource elements of a time-frequency grid, by configuring short resource element groups (sREGs) is provided. The method includes receiving the sPDCCH from the network node 14 on one of a plurality of sets of PRBs S106.

According to this aspect, in some embodiments, the sPDCCH is of 2 OFDM symbols. In some embodiments, the method further includes receiving an indication of a sequential order of PRBs from the network node 14.

According to another aspect, a wireless device 16 for receiving information on a short physical downlink control channel (sPDCCH) signaled by a network node 14, the sPDCCH being mapped to resource elements of a time-frequency grid, by configuring short resource element groups (sREGs) is provided. The wireless device 16 includes a transceiver 48 configured to receive the sPDCCH from the network node 14 on one of a plurality of sets of PRBs.

According to this aspect, in some embodiments, the sPDCCH is of 2 OFDM symbols. In some embodiments, the transceiver 48 is further configured to receive an indication of a sequential order of PRBs from the network node 14.

According to yet another aspect, a wireless device 16 for receiving information on a short physical downlink control channel (sPDCCH), signaled by a network node 14, the sPDCCH being mapped to resource elements of a time-frequency grid, by configuring short resource element groups (sREGs) is provided. The wireless device 16 includes a transceiver module 49 configured to receive the sPDCCH from the network node 14 on one of a plurality of sets of PRBs.

Some Embodiments Include:

Embodiment 1. A method in network node for mapping a short physical downlink control channel, sPDCCH, to resource elements of a time-frequency grid to achieve one of high frequency diversity and condensed frequency allocation, the method comprising:
  determining available time-frequency resources to be configured as short resource element groups, sREGs; and
  configuring sREGs within a physical resource block, PRB, to map the sPDDCH to the resource elements, the number of sREGs depending upon a number of orthogonal frequency division multiplex, OFDM, symbols of the sPDCCH, each sREG spanning one OFDM symbol.

Embodiment 2. The method of Embodiment 1, wherein the sREGs are configured to be one of localized in a frequency domain to facilitate beam forming and distributed in the frequency domain to achieve frequency diversity gain.

Embodiment 3. The method of Embodiment 1, wherein 1 OFDM symbol sPDCCH is defined for cell-specific reference symbol, CRS, based transmissions and at least two OFDM symbol sPDCCH is defined for short transmission time interval, sTTI, operation.

Embodiment 4. The method of Embodiment 1, wherein a 2 OFDM symbol sPDCCH is defined for demodulation reference symbols, DMRS-based transmissions.

Embodiment 5. A network node for mapping a short physical downlink control channel, sPDCCH, to resource elements of a time-frequency grid to achieve one of high frequency diversity and condensed frequency allocation, the network node comprising:
  processing circuitry including a memory and a processor:
    the memory configured to store a mapping of the sPDCCH to resource elements of a time-frequency grid; and
    the processor configured to configure short resource element groups, sREGs, within a physical resource block, PRB, to map the sPDDCH to the resource elements, the number of sREGs depending upon a number of orthogonal frequency division multiplex, OFDM, symbols of the sPDCCH, each sREG spanning one OFDM symbol.

Embodiment 6. The network node of Embodiment 5, wherein the sREGs are configured to be one of localized in a frequency domain to facilitate beam forming and distributed in the frequency domain to achieve frequency diversity gain.

Embodiment 7. The network node of Embodiment 5, wherein 1 OFDM symbol sPDCCH is defined for cell-specific reference symbol, CRS, based transmissions and at least two OFDM symbol sPDCCH is defined for short transmission time interval, sTTI, operation.

Embodiment 8. The network node of Embodiment 5, wherein a 2 OFDM symbol sPDCCH is defined for demodulation reference symbols, DMRS-based transmissions.

Embodiment 9. A network node for mapping a short physical downlink control channel, sPDCCH, to resource elements of a time-frequency grid to achieve one of high frequency diversity and condensed frequency allocation, the network node comprising:
  a memory module configured to store a mapping of the sPDCCH to resource elements of a time-frequency grid; and
  a short resource element group (sREG) configuration module configured to configure short resource element groups, sREGs, within a physical resource block, PRB, to map the sPDDCH to the resource elements, the number of sREGs depending upon a number of orthogonal frequency division multiplex, OFDM, symbols of the sPDCCH, each sREG spanning one OFDM symbol.

Embodiment 10. A method in a wireless device for obtaining a short physical downlink control channel, sPDCCH, signaled by a network node, the sPDCCh being mapped to resource elements of a time-frequency grid, by configuring short resource element groups, sREGs, the method comprising:
receiving signaling from the network node, the signaling including a sPDCCH; and
decoding the signaling to obtain the sPDDCH.

Embodiment 11. A wireless device for obtaining a short physical downlink control channel, sPDCCH, signaled by a network node, the sPDCCh being mapped to resource elements of a time-frequency grid, by configuring short resource element groups, sREGs, the wireless device comprising:
a transceiver configured to receive signaling from the network node;
processing circuitry including a memory and a processor;
the memory configured to store the sPDCCH; and
the processor configured to decode the signaling to obtain the sPDCCH.

Embodiment 12. A wireless device for obtaining a short physical downlink control channel, sPDCCH, signaled by a network node, the sPDCCh being mapped to resource elements of a time-frequency grid, by configuring short resource element groups, sREGs, the wireless device comprising:
a transceiver module configured to receive signaling from the network node;
a memory module configured to store the sPDCCH; and
a decoder configured to decode the signaling to obtain the sPDCCH.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby provide a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method in a wireless device for receiving information on a physical downlink control channel, PDCCH, signaled by a network node, the PDCCH being mapped to resource element groups, REGs, each REG spanning only one orthogonal frequency division multiplex, OFDM, symbol, the PDCCH comprising at least one control-channel element, CCE, a CCE to REG mapping being one of localized in a frequency domain and distributed in the frequency domain, the method comprising:

receiving the PDCCH from the network node, the PDCCH being two or more OFDM symbols; and for the CCE to REG mapping distributed in the frequency domain, the REGs being distributed in groups of REGs, each group of REGs being mapped to consecutive physical resource blocks, PRBs, a REG consisting of 1 PRB within 1 OFDM symbol.

2. The method of claim 1, wherein the 1 PRB within 1 OFDM symbol includes resource elements, REs, for demodulation reference signals, DMRS, applied to DMRS-based downlink control channels.

3. The method of claim 1, further comprising configuring the wireless device by radio resource control, RRC, signaling to use a demodulation reference signal, DMRS, based downlink control channel resource block set with one of distributed or localized mapping of control channel elements, CCE, to REGs.

4. A wireless device for receiving information on a physical downlink control channel, PDCCH, signaled by a network node, the PDCCH being mapped to resource element groups, REGs, each REG spanning only one orthogonal frequency division multiplex, OFDM, symbol, the PDCCH comprising at least one control-channel element, CCE, a CCE to REG mapping being one of localized in a frequency domain and distributed in the frequency domain, the wireless device comprising:

a transceiver configured to receive the PDCCH from the network node, the PDCCH being two or more OFDM symbols; and for the CCE to REG mapping distributed in the frequency domain, the REGs being distributed in groups of REGs, each group of REGs being mapped to consecutive physical resource blocks, PRBs, a REG consisting of 1 PRB within 1 OFDM symbol.

5. The wireless device of claim 4, wherein the 1 PRB within 1 OFDM symbol includes resource elements, REs, for demodulation reference signals, DMRS, applied to DMRS-based downlink control channels.

6. A method in a network node, the method comprising:

mapping a physical downlink control channel, PDCCH, to resource elements groups, REGs, each REG spanning only one orthogonal frequency division multiplexing, OFDM, symbol, the PDCCH comprising at least one control-channel element, CCE, a CCE to REG mapping being one of localized in a frequency domain and distributed in the frequency domain;

transmitting the PDCCH from the network node, for the CCE to REG mapping distributed in the frequency domain, the REGs being distributed in groups of REGs, each group of REGs being mapped to consecutive physical resource blocks, PRBs, a REG consisting of 1 PRB within 1 orthogonal frequency division multiplex, OFDM, symbol, the PDCCH being two or more OFDM symbols.

7. The method of claim 6, wherein the 1 PRB within 1 OFDM symbol includes resource elements, REs, for demodulation reference signals, DMRS, applied to DMRS-based downlink control channels.

8. The method of claim 6, further comprising configuring a wireless device by radio resource control, RRC, signaling to use a demodulation reference signal, DMRS, based downlink control channel resource block set with one of distributed or localized mapping of control channel elements, CCE, to REGs.

9. A network node, the network node comprising:
processing circuitry configured to:
map a physical downlink control channel, PDCCH, to resource elements groups, REGs, each REG spanning only one orthogonal frequency division multiplexing, OFDM, symbol, the PDCCH comprising at least one control-channel element, CCE, a CCE to REG mapping being one of localized in a frequency domain and distributed in the frequency domain;
cause transmission of the PDCCH from the network node, for the CCE to REG mapping distributed in the frequency domain, the REGs being distributed in groups of REGs, each group of REGs being mapped to consecutive physical resource blocks, PRBs, a REG consisting of 1 PRB within 1 orthogonal frequency division multiplex, OFDM, symbol, the PDCCH being two or more OFDM symbols.

10. The network node of claim 9, wherein the 1 PRB within 1 OFDM symbol includes resource elements, REs, for demodulation reference signals, DMRS, applied to DMRS-based downlink control channels.

11. The network node of claim 9, wherein a short resource element group, sREG, consists of 1 PRB within 1 OFDM symbol including resource elements, REs, for at least one of cell-specific reference signals, CRS, and demodulation reference signals, DMRS, applied to CRS-based downlink control channel.

12. The network node of claim 9, wherein short resource element groups, sREGs, are configured to be one of localized in a frequency domain and distributed in the frequency domain.

13. The network node of claim 9, further comprising configuring a wireless device by radio resource control, RRC signaling to use a cell-specific reference signal, CRS, based downlink control channel resource block set with one of distributed or localized mapping of short control channel elements, sCCE, to short resource element groups, sREGs.

14. The network node of claim 9, further comprising configuring a wireless device by radio resource control, RRC, signaling to use a demodulation reference signal, DMRS, based downlink control channel resource block set with one of distributed or localized mapping of short control channel elements, sCCE, to a short resource element groups, sREGs.

15. The network node of claim 9, further comprising configuring a downlink control channel PRB set with at least:
a set of PRBs; and
one of localized and distributed short control channel elements, sCCE to short resource element group, sREG, mapping.

16. The network node of claim 9, wherein 1 OFDM symbol downlink control channel is defined for cell-specific reference symbol, CRS, based transmissions.

* * * * *